United States Patent
Park et al.

(10) Patent No.: US 9,836,226 B2
(45) Date of Patent: Dec. 5, 2017

(54) METHOD OF PROCESSING INPUT/OUTPUT IN STORAGE DEVICE AND STORAGE DEVICE AND NON-VOLATILE MEMORY DEVICE USING THE METHOD

(71) Applicants: Young-Ho Park, Anyang-si (KR); Chan-Ik Park, Suwon-si (KR); Chul Lee, Hwaseong-si (KR); In-Hwan Doh, Seoul (KR); Nam-Wook Kang, Hwaseong-si (KR); Kwang-Hun Lee, Hwaseong-si (KR); In-Sung Song, Suwon-si (KR)

(72) Inventors: Young-Ho Park, Anyang-si (KR); Chan-Ik Park, Suwon-si (KR); Chul Lee, Hwaseong-si (KR); In-Hwan Doh, Seoul (KR); Nam-Wook Kang, Hwaseong-si (KR); Kwang-Hun Lee, Hwaseong-si (KR); In-Sung Song, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 32 days.

(21) Appl. No.: 15/000,065

(22) Filed: Jan. 19, 2016

(65) Prior Publication Data
US 2016/0224255 A1    Aug. 4, 2016

(30) Foreign Application Priority Data
Feb. 2, 2015    (KR) .......................... 10-2015-0016184

(51) Int. Cl.
*G06F 3/06*    (2006.01)
(52) U.S. Cl.
CPC .......... *G06F 3/0611* (2013.01); *G06F 3/0659* (2013.01); *G06F 3/0679* (2013.01)

(58) Field of Classification Search
CPC .................................................. G06F 3/0659
See application file for complete search history.

(56) References Cited

U.S. PATENT DOCUMENTS 6,292,856 B1 * 9/2001 Marcotte ............... G06F 13/102
                                                                         710/263
7,840,720 B2   11/2010 Kalos et al.
(Continued)

FOREIGN PATENT DOCUMENTS

| JP | 2011-165105 | 8/2011 |
| JP | 2012-216004 | 11/2012 |
| KR | 10-0653463 | 5/2006 |

OTHER PUBLICATIONS

Qureshi et al. "Improving Read Performance of Phase Change Memories Via Write Cancellation and Write Pausing", 2010 IEEE 16th International Symposium on High Performance Computer Architecture (HPCA) Jan. 9-14, 2010 (labeled as "A017 NPL Qureshi").*

*Primary Examiner* — Edward Dudek, Jr.
*Assistant Examiner* — Andrew Russell
(74) *Attorney, Agent, or Firm* — Volentine & Whitt, PLLC

(57) ABSTRACT

A method of processing input/output (I/O) in a storage device includes adjusting a read anticipation time based on a change of a resource management status related to operations of the storage device and performing an I/O processing operation at the storage device based on the adjusted read anticipation time. The I/O processing operation is performed to postpone an operation regarding a program command and perform a read command at higher priority than a write command at the storage device in a period from completion of a read operation at the storage device until the read anticipation time has elapsed.

20 Claims, 25 Drawing Sheets

(56) References Cited

U.S. PATENT DOCUMENTS

| | | |
|---|---|---|
| 8,448,178 B2 | 5/2013 | Daly et al. |
| 8,468,318 B2 | 6/2013 | Colgrove et al. |
| 8,589,625 B2 | 11/2013 | Colgrove et al. |
| 8,706,949 B2 | 4/2014 | Gross et al. |
| 8,806,070 B2 | 8/2014 | Bita |
| 2010/0049913 A1* | 2/2010 | Marcu .................. G06F 3/0611 711/114 |
| 2010/0191876 A1 | 7/2010 | Muppirala et al. |
| 2012/0066435 A1* | 3/2012 | Colgrove ............... G06F 3/061 711/103 |
| 2012/0278664 A1 | 11/2012 | Kazui et al. |
| 2013/0198420 A1* | 8/2013 | Nishikawa ............... G11C 7/10 710/57 |
| 2013/0205085 A1* | 8/2013 | Hyun .................... G11C 16/10 711/114 |
| 2014/0156911 A1 | 6/2014 | Alcantara et al. |
| 2015/0355854 A1* | 12/2015 | Song .................... G06F 3/0619 711/103 |

* cited by examiner

METHOD OF PROCESSING INPUT/OUTPUT IN STORAGE DEVICE AND STORAGE DEVICE AND NON-VOLATILE MEMORY DEVICE USING THE METHOD

CROSS-REFERENCE TO RELATED APPLICATION

This application claims the benefit of Korean Patent Application No. 10-2015-0016184, filed on Feb. 2, 2015, in the Korean Intellectual Property Office, the disclosure of which is incorporated herein in its entirety by reference.

BACKGROUND

The disclosure relates to a method and an apparatus for processing input and output, and more particularly, to a method of processing input/output in a storage device and a storage device and a non-volatile memory device using the method.

A flash memory device, which is a non-volatile memory device, is widely used by storage devices due to high speeds and low power consumption. A storage device employing a flash memory device is utilized in a web server, a file server, or a database (DB) server that is frequently accessed. The servers have input/output (I/O) patterns with different characteristics, respectively, and there is a demand for research into I/O processing operations for maximizing the performances thereof.

SUMMARY

The disclosure provides a method of processing inputs/outputs (I/Os) in a storage device for effectively performing I/Os in I/O patterns having various characteristics.

The disclosure also provides a storage device for effectively performing I/Os in I/O patterns having various characteristics.

The disclosure also provides a non-volatile memory for effectively performing I/Os in I/O patterns having various characteristics.

According to an aspect of the disclosure, there is provided a method of processing input/output (I/O) in a storage device, the method including: (1) adjusting a read anticipation time based on a change of a resource management status related to operations of the storage device and (2) performing an I/O processing operation at the storage device based on the adjusted read anticipation time. The I/O processing operation is performed to postpone an operation regarding a program command and perform a read command at higher priority than a write command at the storage device in a period from completion of a read operation at the storage device until the read anticipation time has elapsed.

According to another aspect of the disclosure, there is provided a storage device including a non-volatile memory device and a memory controller. The memory controller: (1) adjusts a read anticipation time based on a change of a resource management status related to operations of the storage device, (2) performs an I/O processing operation to block an operation regarding a program command at the non-volatile memory device regardless of an order in which commands are requested, and (3) performs a read command at higher priority than a write command, in a period from completion of a read operation at the storage device until the read anticipation time has elapsed.

According to another aspect of the disclosure, there is provided a non-volatile memory device including a memory cell array connected to a plurality of word lines and a plurality of bit lines. A control logic: (1) generates a read control signal based on a read command received from a memory controller and (2) based on information regarding a read anticipation time received from the memory controller, postpones generation of a program control signal for processing a program command received from the memory controller in a period from completion of a read operation until the read anticipation time has elapsed. A voltage generating unit generates driving voltages for performing a read operation or a program operation based on the read control signal or the program control signal. A row decoder generates voltages to be applied to the word lines based on the read control signal or program control signal and the driving voltages. A page buffer stores data read out from the memory cell array or data to be programmed to the memory cell array based on the read control signal or the program control signal.

According to another aspect of the disclosure, there is provided a storage device that includes a nonvolatile memory, in which data is stored in memory cells and retrieved from the memory cells in accordance with received commands, and a memory controller. The memory controller: (1) predetermines a period based on a resource usage of the memory controller, (2) receives a program request from a host, (3) generates a program command for programming data into the nonvolatile memory based upon the program request, and (4) withholds issuing the program command to the nonvolatile memory until the predetermined period has expired from the completion, by the nonvolatile memory, of a command last issued by the memory controller to the nonvolatile memory.

According to another aspect of the disclosure, there is provided a storage device that includes a nonvolatile memory, in which data is stored in memory cells and retrieved from the memory cells in accordance with received commands, and control logic. The control logic prevents a program command issued by a memory controller from being executed in the nonvolatile memory until a predetermined period has expired from the completion, by the nonvolatile memory, of a command last executed by the nonvolatile memory.

BRIEF DESCRIPTION OF THE DRAWINGS

Exemplary embodiments of the disclosure will be more clearly understood from the following detailed description taken in conjunction with the accompanying drawings in which.

DETAILED DESCRIPTION OF THE EMBODIMENTS

Figure 1:
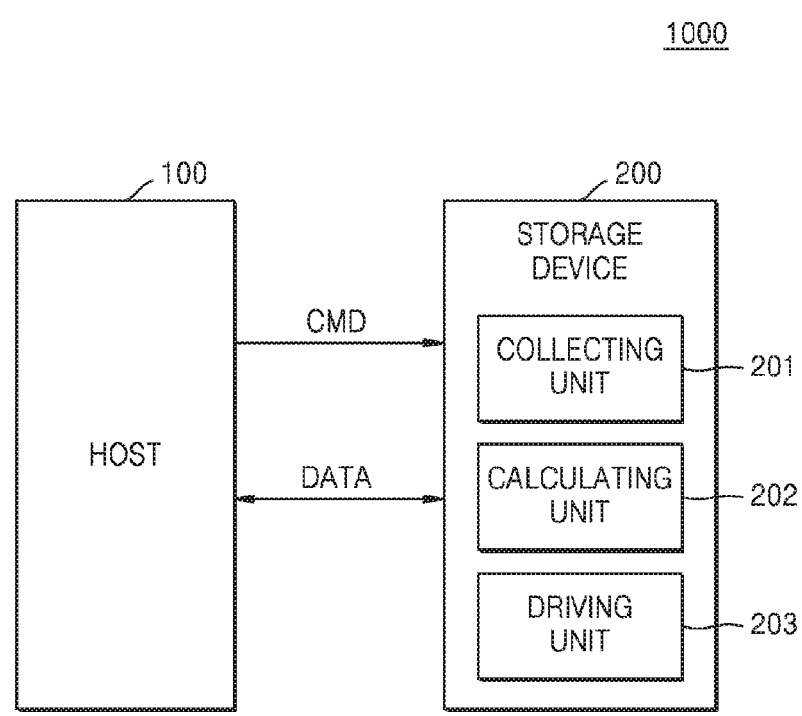
FIG. 1 is a diagram showing a computing system according to an embodiment.

Hereinafter, the present disclosure will be described more fully with reference to the accompanying drawings, in which exemplary embodiments of the disclosure are shown. This disclosure may, however, be embodied in many different forms and should not be construed as limited to the exemplary embodiments set forth herein. Rather, these embodiments are provided so that this disclosure will be thorough and complete, and will fully convey the scope of the disclosure to one of ordinary skill in the art. In the drawings, lengths and sizes of layers and regions may be exaggerated for clarity. As used herein, the term "and/or" includes any and all combinations of one or more of the associated listed items. Expressions such as "at least one of," when preceding a list of elements, modify the entire list of elements and do not modify the individual elements of the list.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram showing a computing system 1000 according to an embodiment.

As shown in FIG. 1, the computing system 1000 includes a host 100 and a storage device 200.

The host 100 is electrically connected to the storage device 200. The host 100 may transmit a command CMD to the storage device 200. Furthermore, the host 100 and the storage device 200 may exchange data with each other. For example, the storage device 200 may be embodied as an embedded multimedia card (eMMC) or a universal flash storage.

The host 100 transmits a command CMD that is issued by the host 100 based on a task to be performed to the storage device 200. For example, a command CMD issued may include a write command or a read command. Furthermore, the host 100 transmits data DATA to be stored in the storage device 200 or receives data DATA read out from the storage device 200.

For example, if data to be processed is stored in the storage device 200, the host 100 transmits a read command to the storage device 200. Furthermore, in the case of storing processed data in the storage device 200, the host 100 transmits a write command to the storage device 200.

In another example, if a page fault occurs, the host 100 transmits to the storage device 200 a read command or a write command for performing at least one of a page-in operation or a page-out operation with respect to a memory swapping operation. A page fault occurs when a page to be read by the host 100, to perform an application process, is not stored in the host 100.

The storage device 200 performs a read operation or a program operation based on a command received from the host 100. In other words, if a read command is received from the host 100, the storage device 200 performs a read operation for reading out data. Furthermore, if a write command is received from the host 100, the storage device 200 performs a program operation for storing data.

The storage device 200 includes a collecting unit 201, a calculating unit 202, and a driving unit 203.

The collecting unit 201 collects information regarding one or more factors indicating a resource management status regarding an operation of the storage device 200. For example, information regarding one or more factors indicating a resource management status may include information regarding one or more factors related to host resources or host workload. In detail, information regarding one or more factors related to host resources may include information regarding queue depths. Furthermore, information regarding one or more factors related to host workload may include at least one of input/output (I/O) count information, I/O size information, or I/O ratio information. In another example, information regarding one or more factors indicating a resource management status may include information regarding one or more factors indicating a management status regarding I/O resources of a storage device or an inter-process communication (IPC) resource management status. In another example, information regarding one or more factors indicating a resource management status may include information regarding one or more factors indicating a resource management status regarding a non-volatile memory device constituting the storage device 200. In detail, information regarding one or more factors indicating a resource management status regarding a non-volatile memory device may include read command issue count information, write command issue count information, or idle time ratio information regarding the non-volatile memory device.

The calculating unit 202 performs an operation for calculating a read anticipation time based on information regarding one or more factors collected by the collecting unit 201.

For example, if collected information regarding one or more factors indicates an increase in the size of data stored in a write cache buffer of the storage device 200, the calculating unit 202 performs an operation for adjusting a read anticipation time to reduce a currently set read anticipation time. Furthermore, if collected information regarding one or more factors indicates a decrease in the size of data stored in a write cache buffer of the storage device 200, the calculating unit 202 performs an operation for adjusting a read anticipation time to increase a currently set read anticipation time.

In another example, if collected information regarding one or more factors indicates an increase in the number of times for issuing write commands to be received by the storage device 200 per unit time, the calculating unit 202 performs an operation for adjusting a read anticipation time to reduce a currently set read anticipation time. Furthermore, if collected information regarding one or more factors indicates a decrease in the number of times for issuing write commands to be received by the storage device 200 per unit time, the calculating unit 202 performs an operation for adjusting a read anticipation time to increase a currently set read anticipation time.

In another example, if collected information regarding one or more factors indicates an increase in the number of times for issuing read commands to be received by the storage device 200 per unit time, the calculating unit 202 performs an operation for adjusting a read anticipation time to reduce a currently set read anticipation time. Furthermore, if collected information regarding one or more factors indicates a decrease in the number of times for issuing read commands to be received by the storage device 200 per unit time, the calculating unit 202 performs an operation for adjusting a read anticipation time to increase a currently set read anticipation time.

The driving unit 203 performs I/O process control operations in the storage device 200 based on a read anticipation time calculated by the calculating unit 202.

For example, the driving unit 203 performs I/O processing operations to postpone issuing a program command to a non-volatile memory device in a period from completion of a read operation at a software module of the storage device 200 to a read anticipation time and to issue the postponed program command at a time point at which the read anticipation time has elapsed.

In another example, the driving unit 203 blocks issuance of a program command and allows issuance of a read command to a non-volatile memory device in a period from completion of a previous read operation at a hardware module of the storage device 200 to the read anticipation time and to issue a program command or a read command to the non-volatile memory based on a sequence of commands received from a host in a period from a time point at which the read anticipation time has elapsed.

In another example, the driving unit 203 may postpone issuance of a program command to a non-volatile memory device in a read anticipation time period by using a dummy I/O.

A program command issued by the storage device 200 is substantially identical to a write command. An operation for writing data in a flash memory device, which is a non-volatile memory device constituting the storage device 200, is referred to as a program command. Therefore, a write command issued by the storage device 200 is referred to as a program command.

Figure 2A:
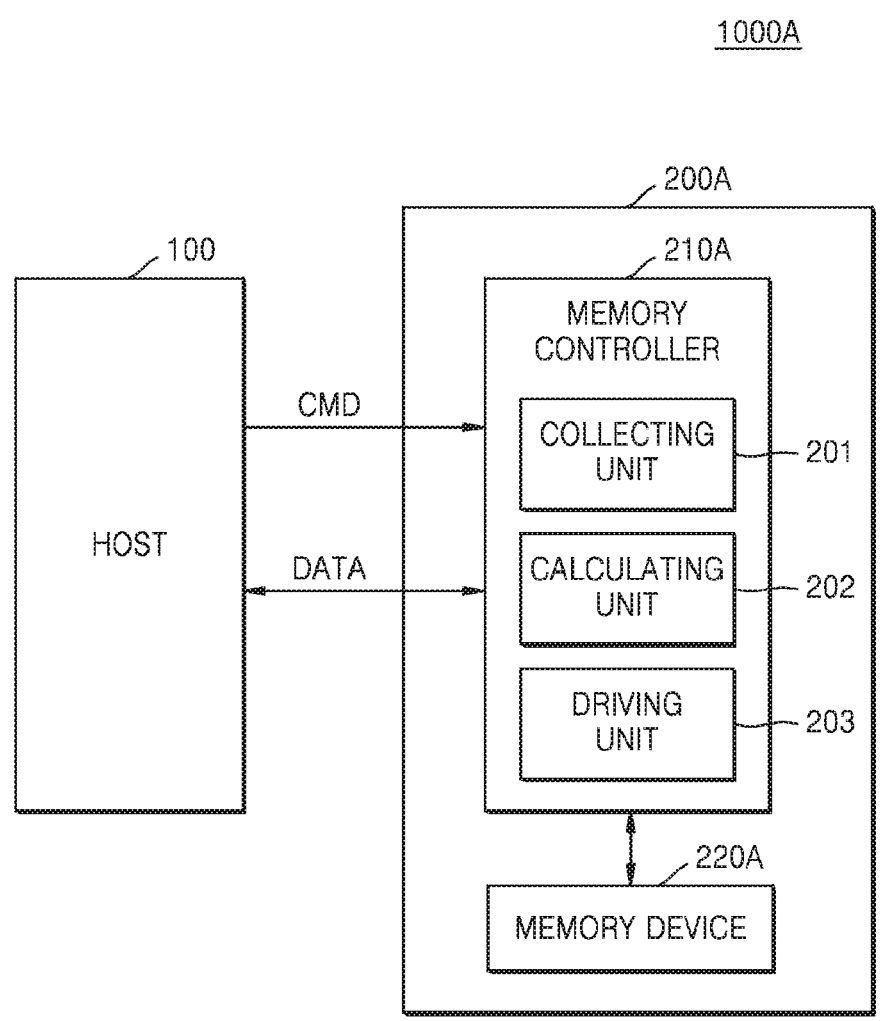
FIG. 2A is a detailed block diagram of a computing system, showing an example of a detailed configuration of a storage device shown in FIG. 1.

FIG. 2A is a detailed block diagram of a computing system 1000A, showing an example of a detailed configuration of the storage device 200 shown in FIG. 1.

As shown in FIG. 2A, the computing system 1000A includes the host 100 and a storage device 200A. Furthermore, the storage device 200A includes a memory controller 210A and a memory device 220A.

The memory device 220A may not only include a flash memory device, but may also include non-volatile memory devices of various types and forms. For example, not only a flash memory device, but also a phase change RAM (PRAM), a ferroelectric RAM (FRAM), or a magnetic RAM (MRAM) may be included in the memory device 220A. In another example, the memory device 220A may include a combination of at least one or more non-volatile memory (memories) and at least one or more volatile memory (memories), or a combination of at least two or more types of non-volatile memory devices.

The memory controller 210A performs an I/O processing operation to perform a read operation or a write operation at the memory device 220A in response to a command received from the host 100.

The memory controller 210A includes the collecting unit 201, the calculating unit 202, and the driving unit 203. Since operations of the collecting unit 201, the calculating unit 202, and the driving unit 203 are described above with reference to FIG. 1, repeated descriptions thereof are omitted below. For example, in the memory controller 210A, the collecting unit 201, the calculating unit 202, and the driving unit 203 may be embodied as hardware modules. In another example, in the memory controller 210A, the collecting unit 201, the calculating unit 202, and the driving unit 203 may be embodied as software modules.

Therefore, the memory controller 210A: (1) collects information regarding one or more factors indicating a resource management status related to a data read operation or a data write operation by using the collecting unit 201, the calculating unit 202 and the driving unit 203, (2) adjusts a read anticipation time based on the collected information regarding one or more factors, and (3) performs an I/O processing operation for delaying issuance of a program command to the memory device 220A based on the adjusted read anticipation time. For example, the memory controller 210A may postpone issuance of a program command in a read anticipation time period by using a dummy I/O.

Figure 2B:
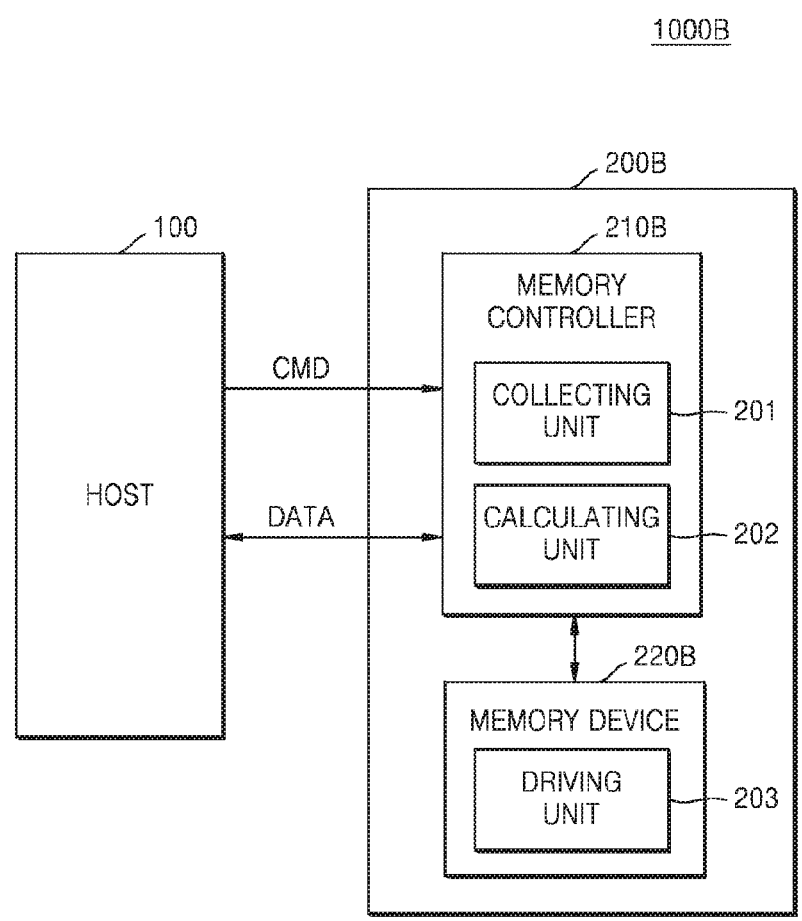
FIG. 2B is a detailed block diagram of a computing system, showing another example of a detailed configuration of the storage device shown in FIG. 1.

FIG. 2B is a detailed block diagram of a computing system 1000B, showing another example of a detailed configuration of the storage device 2000 shown in FIG. 1.

As shown in FIG. 2B, the computing system 1000B includes the host 100 and a storage device 200B. Furthermore, the storage device 200B includes a memory controller 210B and a memory device 220B.

The memory controller 210B performs an I/O processing operation to perform a read operation or a write operation at the memory device 220B in response to a command received from the host 100. In detail, the memory controller 210B transmits a read command or a write command to the memory device 220B in response to a command received from the host 100.

Furthermore, the memory controller 210B includes the collecting unit 201 and the calculating unit 202. The memory controller 210B collects information regarding one or more factors indicating a resource management status related to a data read operation or a data write operation by using the collecting unit 201 and the calculating unit 202 and adjusts a read anticipation time based on the collected information regarding one or more factors. The memory controller 210B transmits information regarding the adjusted read anticipation time to the memory device 220B. For example, the memory controller 210B may transmit information regarding the read anticipation time to the memory device 220B by using a command.

The memory device 220B may not only include a flash memory device, but may also include non-volatile memory devices of various types and forms. For example, not only a flash memory device, but also PRAM, FRAM, or MRAM may be included in the memory device 220B. In another example, the memory device 220B may include a combination of at least one or more non-volatile memory (memories) and at least one or more volatile memory (memories), or a combination of at least two or more types of non-volatile memory devices.

The memory device 220B includes the driving unit 203. In the memory device 220B, the driving unit 203 may be embodied as a hardware module or a software module.

The memory device 220B performs an I/O processing operation to perform a read operation or a write operation at the memory device 220 based on information regarding a read anticipation time received from the memory controller 210B.

For example, the memory device 220B performs an operation for delaying an execution schedule regarding a program command received from the memory controller 210B, based on information regarding a read anticipation time. In detail, the memory device 220B postpones generation of a program control signal for processing a program command received from the memory controller 210B in a period from completion of a read operation to end of a read anticipation time and generates a read control signal for processing a read command at higher priority than a write command.

Figure 3:
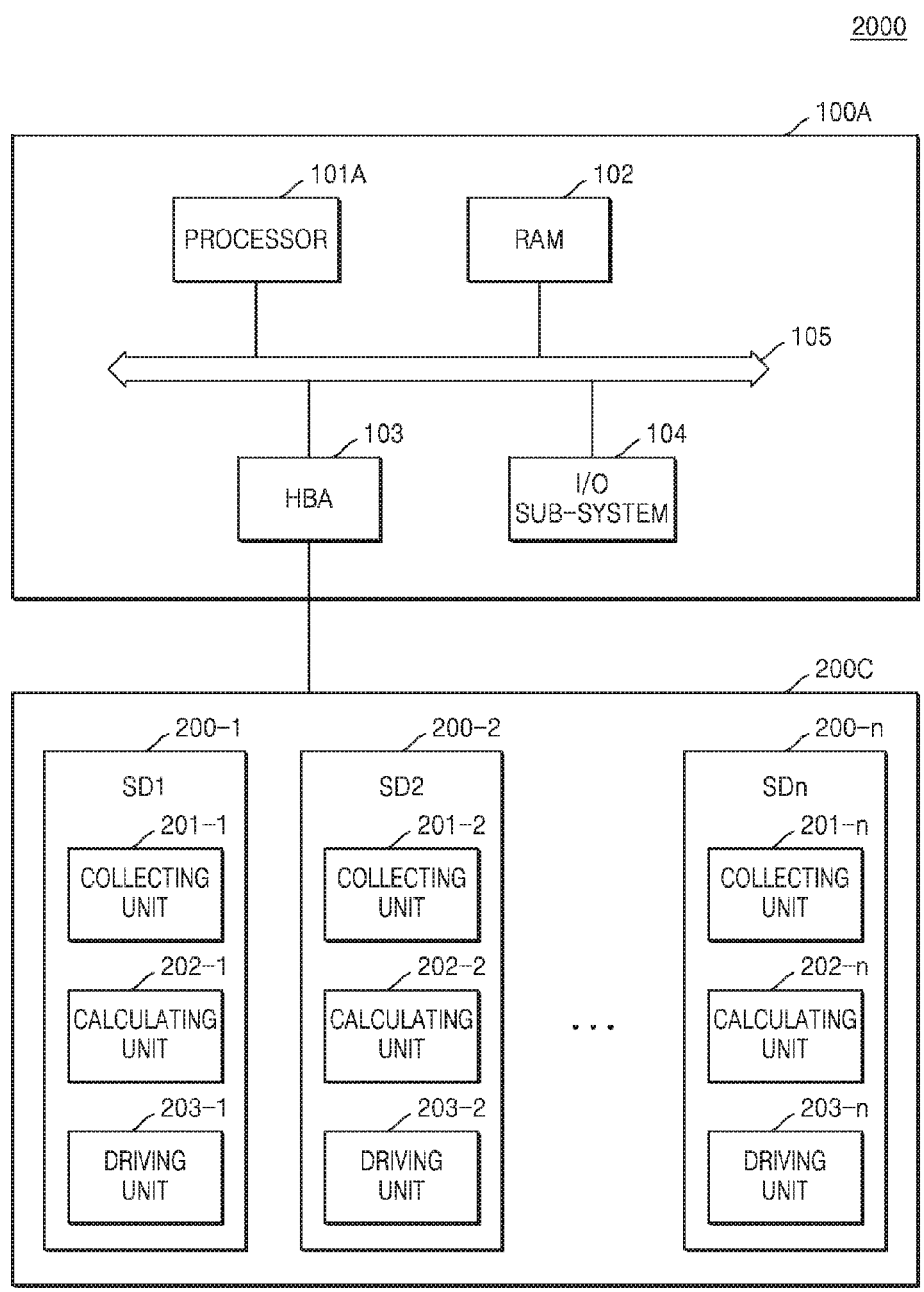
FIG. 3 is a diagram showing a computing system according to another embodiment.

FIG. 3 is a diagram showing a computing system 2000 according to another embodiment.

Referring to FIG. 3, the computing system 2000 includes a processor 101A, a random access memory (RAM) 102, a host bus adapter (HBA) 103, an I/O sub-system 104, a bus 105, and storage devices 200C.

In FIG. 3, a block including the processor 101A, the RAM 102, the HBA 103, the I/O sub-system 104, and the bus 105 may be a host 100A, whereas the storage devices 200C may be external devices to be connected to the host 100A.

For example, it may be assumed that the computing system 2000 is a server. In detail, the computing system 2000 may be a web server, a file server, a database (DB) server, etc. In another example, the computing system 2000 may also be a personal computer (PC), a set-top box, a digital camera, a navigation device, a mobile device, etc. For example, storage devices 200C to be connected to the host 100 may include n (n is an integer equal to or greater than 2) storage devices SD1 through SDn 200-1 through 200-n.

The processor 101A may include circuits, interfaces, or program codes for processing data and controlling operations of the components of the computing system 2000. For example, the processor 101A may include a central processing unit (CPU), an advanced RISC machine (ARM), or an application specific integrated circuit (ASIC).

The RAM 102 may include static RAM (SRAM) or dynamic RAM (DRAM) for storing data, commands, or program codes that are necessary for operating the computing system 2000. The RAM 102 functions as a main memory.

The processor 101A transmits a read command or a write command to the storage devices 200-1 through 200-n connected via the HBA 103 by using program codes stored in the RAM 102.

The HBA 103 is an adapter for connecting the storage devices 200-1 through 200-n to the host 100A of the computing system 2000. For example, the HBA 103 may include a SCSI adapter, a fiber channel (FC) adapter, a serial ATA adapter, etc. In detail, the HBA 103 may be directly connected to FC HBA-based storage devices 200-1 through 200-n. Furthermore, the HBA 103 may interconnect the host 100A and the storage devices 200-1 through 200-n under a storage area network (SAN) environment and may interface between the host 100A and the storage devices 200-1 through 200-n.

The I/O sub-system 104 may include circuits, interfaces, or codes that may be used for data communication between parts constituting the computing system 2000. The I/O sub-system 104 may include one or more standard buses and one or more bus controllers. Therefore, the I/O sub-system 104 may recognize devices connected to the bus 105, and may allocate and deallocate resources for various devices connected to the bus 105. In other words, the I/O sub-system 104 may manage communication on the bus 105. For example, the I/O sub-system 104 may be a PCIe system and may include a PCIe root complex and one or more PCIe switch(es) or bridge(s).

For example, each of the storage devices 200-1 through 200-n may be embodied as the storage device 200 shown in FIG. 1. In another example, each of the storage devices 200-1 through 200-n may be embodied as a solid state drive (SSD) or a hard disk drive (HDD). Each of the storage devices 200-1 through 200-n includes a collecting unit 201-$i$, a calculating unit 202-$i$, and a driving unit 203-$i$. Since operations of the collecting unit 201-$i$, the calculating unit 202-$i$, and the driving unit 203-$i$ are substantially identical to the operations of the collecting unit 201, the calculating unit 202, and the driving unit 203 described above with reference to FIG. 1, repeated descriptions thereof are omitted below.

Figure 4:
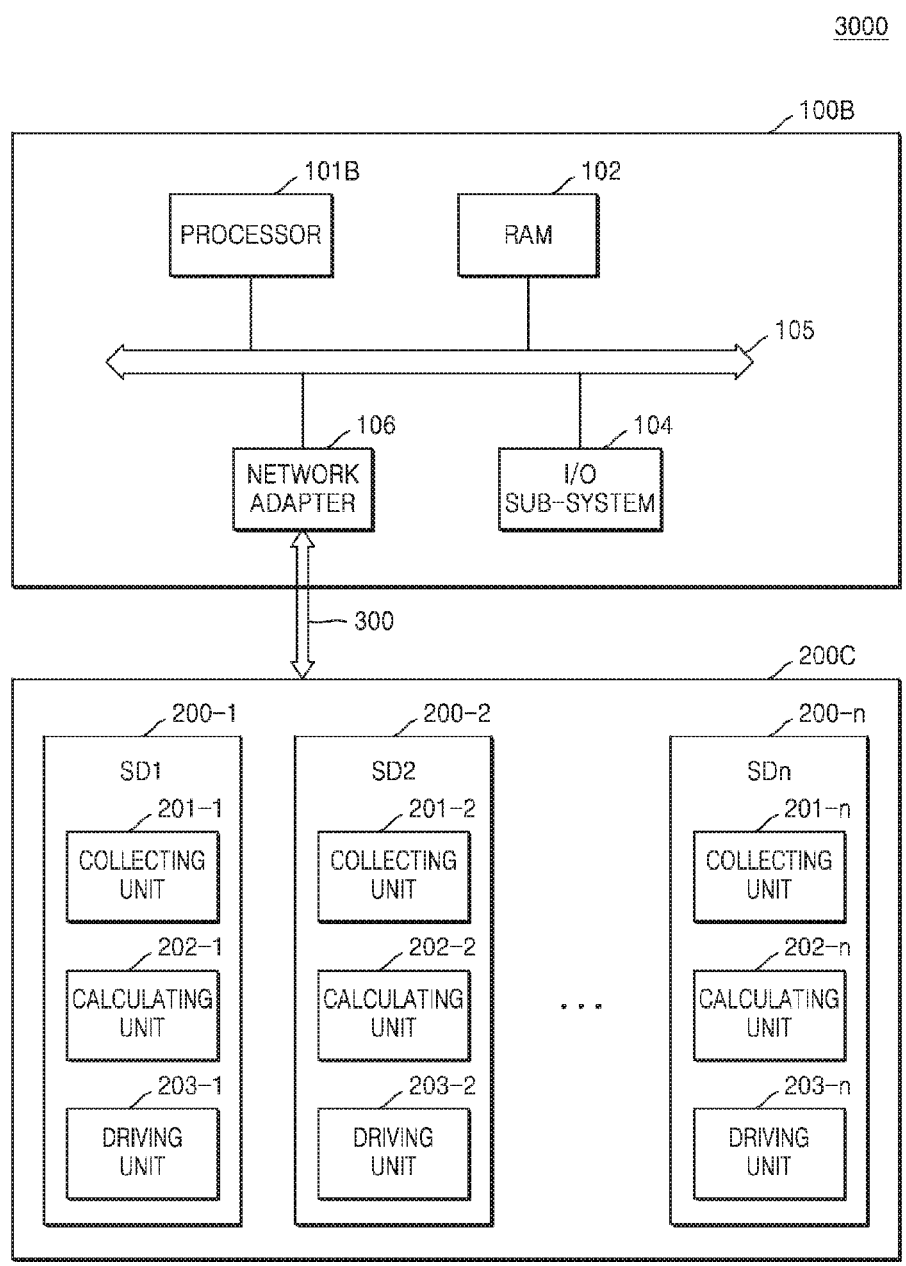
FIG. 4 is a diagram showing a computing system according to another embodiment.

FIG. 4 is a diagram showing a computing system 3000 according to another embodiment.

Referring to FIG. 4, the computing system 3000 includes a host 100B, the storage devices 200C, and a linking unit 300.

The host 100B includes a processor 101B, the RAM 102, the I/O sub-system 104, a network adapter 106, and the bus 105. For example, it may be assumed that the host 100B is a server. In another example, the host 100B may also be a personal computer (PC), a set-top box, a digital camera, a navigation device, a mobile device, etc.

Since the RAM 102, the I/O sub-system 104, the bus 105, and the storage devices 200-1 through 200-n constituting the host 100B are described above in connection with the computing system 2000 shown in FIG. 3, repeated descriptions thereof are omitted.

The network adapter 106 may be connected to the storage devices 200C via the linking unit 300. For example, the linking unit 300 may include copper wires, fiber optic cables, one or more wireless channels, or a combination thereof.

The network adapter 106 may include circuits, interfaces, or codes that may be used to transmit and receive data according to one or more network standards. For example, the network adapter 106 may communicate with the storage devices 200C via one or more Ethernet standards.

The processor 101B may include circuits, interfaces, or program codes for processing data and controlling operations of the components of the computing system 3000. For example, the processor 101B may include a CPU, an ARM, or an ASIC.

The processor 101B transmits a read command or a write command to the storage devices 200-1 through 200-n connected via the network adapter 106 by using program codes stored in the RAM 102.

Figure 5:
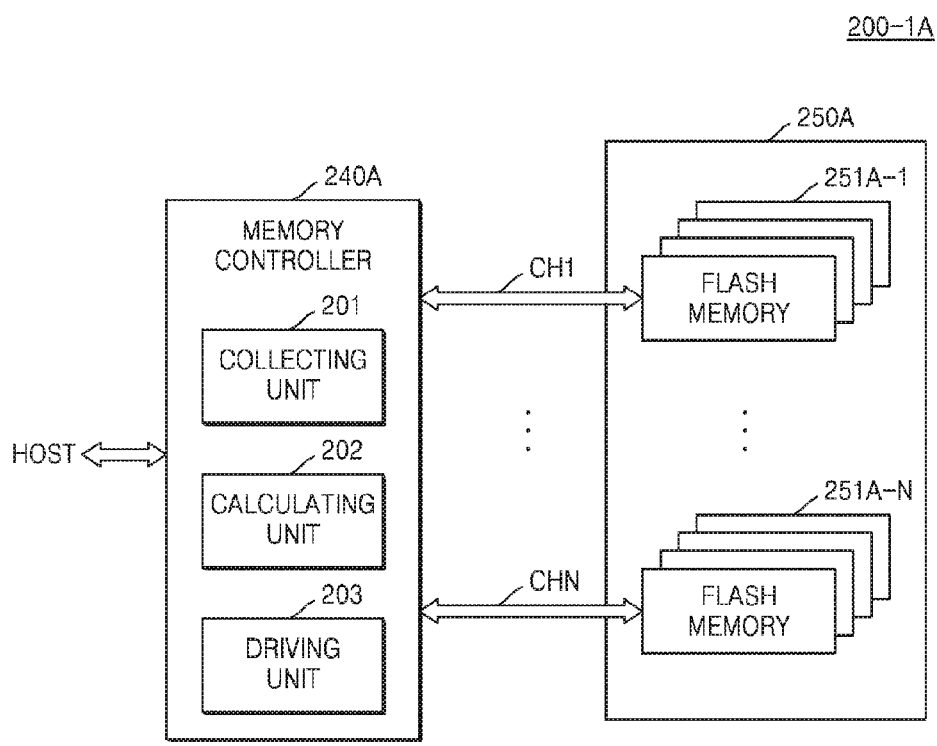
FIG. 5 is a diagram showing an example of configuration of a detailed configuration of one of the storage devices shown in FIGS. 3 and 4.

FIG. 5 is a diagram showing an example of configuration of a detailed configuration of one of the storage devices 200C shown in FIGS. 3 and 4.

As shown in FIG. 5, a storage device 200-1A includes a memory controller 240A and a memory device 250A.

For example, if the storage device 200-1A is embodied as a non-volatile memory device, such as a flash memory, the storage device 200-1A may be an SSD, which is also referred to as a solid state disc.

FIG. 5 shows an example in which the memory device 250A includes flash memory devices 251A-1 and 251A-N. FIG. 5 shows an example in which 4 flash memory devices are combined per channel.

The memory device 250A may not only include a flash memory device, but may also include non-volatile memory devices of various types and forms. For example, not only a flash memory device, but also phase change RAM (PRAM), ferroelectric RAM (FRAM), or magnetic RAM (MRAM) may be included in the memory device 250A. In another example, the memory device 250A may include a combination of at least one or more non-volatile memory (memories) and at least one or more volatile memory (memories), or a combination of at least two or more types of non-volatile memory devices.

The memory controller 240A may issue a program command or a read command for performing a write operation or a read operation at the memory device 250A in response to a request from the host 100. The request of the host 100 may be transmitted to the memory controller 240A in the form of a command.

Data I/O processing operations between the memory controller 240A and a host may be formed of successive logical address units. Here, an I/O processing operation requested at once may be defined as a request.

Channels CH1 through CHN for I/O processing signals that are necessary for performing operations are formed between the memory controller 240A and the memory device 250A. Examples of signals that are necessary for performing operations may include commands, addresses, and data.

The memory controller 240A includes the collecting unit 201, the calculating unit 202, and the driving unit 203. Since descriptions of operations of the collecting unit 201, the calculating unit 202, and the driving unit 203 are given above with reference to FIG. 1, repeated descriptions thereof are omitted. For example, the memory controller 240A collects information regarding one or more factors indicating a resource management status per channel by using the collecting unit 201 and the calculating unit 202 and may adjust a read anticipation time of each channel based on the information regarding one or more factors collected per channel. Furthermore, the memory controller 240A may control an I/O processing operation between the memory controller 240A and the memory device 250A of each channel by using the driving unit 203, based on a read anticipation time adjusted with respect to each channel. In detail, after the memory controller 240A completes a read operation through each channel, the memory controller 240A may postpone an I/O processing operation for performing a program command in the channel corresponding to the I/O processing operation before a read anticipation time regarding the corresponding channel has elapsed and set higher priority to an I/O processing operation for performing a read operation.

For example, in the memory controller 240A, the collecting unit 201, the calculating unit 202, and the driving unit 203 may be embodied as hardware modules. In another example, in the memory controller 240A, the collecting unit 201, the calculating unit 202, and the driving unit 203 may be embodied as software modules.

Therefore, the memory controller 240A may collect information regarding one or more factors indicating a resource management status related to a data read operation or a data write operation by using the collecting unit 201, the calculating unit 202, and the driving unit 203, adjust a read anticipation time based on the collected information regarding one or more factors, and postpone issuance of a program command to the memory device 250A based on the adjusted read anticipation time.

In the storage device 200-1A according to an embodiment, one or more channels may be formed between the memory controller 240A and the memory device 250A. FIG. 1 shows an example that N (N is an integer equal to or greater than 2) channels are formed.

Furthermore, a plurality of banks may be connected to each of the channels. Here, a bank refers to flash memory devices sharing a channel. Here, a bank may also be referred to as a way.

Figure 6:
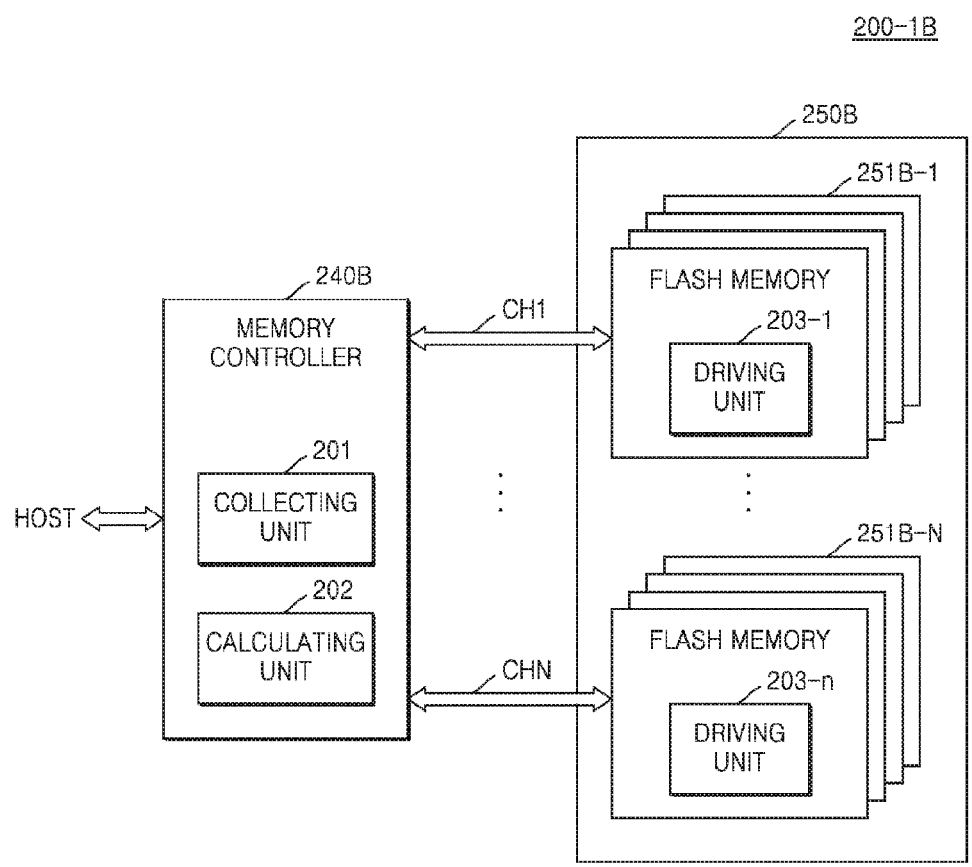
FIG. 6 is a diagram showing another example of a detailed configuration of one of the storage devices shown in FIGS. 3 and 4.

FIG. 6 is a diagram showing another example of a detailed configuration of one of the storage devices shown in FIGS. 3 and 4.

As shown in FIG. 6, a storage device 200-1B includes a memory controller 240B and a memory device 250B.

For example, if the storage device 200-1B is embodied as a non-volatile memory device, such as a flash memory device, the storage device 200-1B may be an SSD.

The memory controller 240B performs an I/O processing operation for performing a read operation or a write operation at the memory device 250B in response to a command received from the host 100. In detail, the memory controller 240B transmits a read command or a program command to the memory device 250B in response to a command received from the host 100.

Furthermore, the memory controller 240B includes the collecting unit 201 and the calculating unit 202. The memory controller 240B collects information regarding one or more factors indicating a resource management status related to a data read operation or a data write operation by using the collecting unit 201 and the calculating unit 202 and adjusts a read anticipation time based on the collected information regarding one or more factors.

The memory controller 240B transmits information regarding the adjusted read anticipation time to flash memory devices 215B-1 through 251B-N included in the memory device 250B. For example, the memory controller 240B may transmit information regarding a read anticipation time to the memory device 250B by using a command.

For example, the memory controller 240B may collect information regarding one or more factors indicating a resource management status related to a data read operation or a data write operation by using the collecting unit 201 and the driving unit 203 and may adjust a read anticipation time of each channel based on the collected information regarding one or more factors. The memory controller 240B transmits information regarding the read anticipation times adjusted for respective channels to flash memory devices 215B-1 through 251B-N included in the memory device 250B. For example, the memory controller 240B may transmit information regarding a read anticipation time regarding respective channels to the flash memory devices via channels corresponding to the flash memory devices.

The flash memory devices 215B-1 through 251B-N included in the memory device 250B respectively include driving units 203-1 through 203-n. In the flash memory devices 215B-1 through 251B-N, the driving units 203-1 through 203-n may be embodied as hardware modules or software modules.

Each of the flash memory devices 215B-1 through 251B-N included in the memory device 250B performs an I/O processing operation to perform a read operation or a write operation based on information regarding a read anticipation time received from the memory controller 240B.

For example, each of the flash memory devices 215B-1 through 251B-N postpones an operation by delaying an execution schedule regarding a program command received from the memory controller 240B, based on information regarding a read anticipation time. In detail, each of the flash memory devices 215B-1 through 251B-N postpones generation of a program control signal for processing a program command received from the memory controller 240B in a period from completion of a read operation to an end of a read anticipation time and generates a read control signal for processing a read command at higher priority than a write command.

Figure 7:
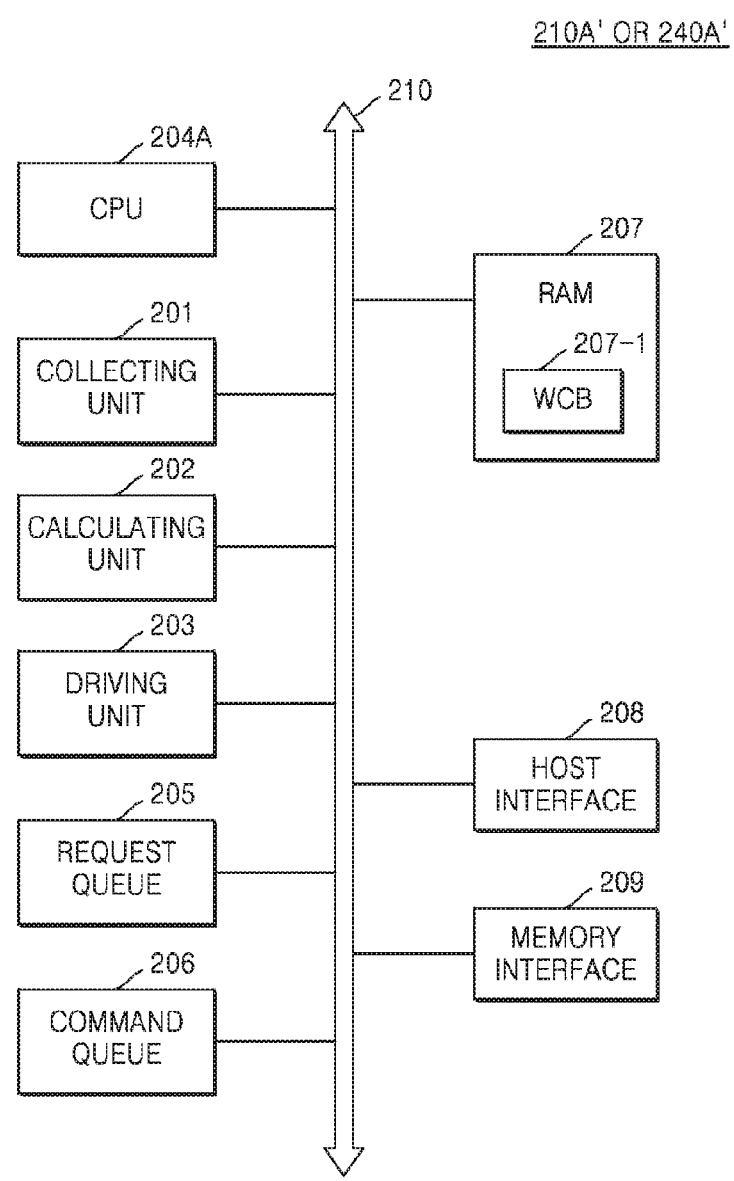
FIG. 7 shows an example of a memory controller shown in FIGS. 2A and 5.

FIG. 7 shows an example of a memory controller 210A' or 240A' as the memory controllers 210A and 240A shown in FIGS. 2A and 5.

Referring to FIG. 7, the memory controller 210A' or 240A' includes a CPU 204A, the collecting unit 201, the calculating unit 202, the driving unit 203, a request queue 205, a command queue 206, RAM 207, a host interface 208, a memory interface 209, and a bus 210. The components of the memory controller 210A' or 240A' may be electrically connected to one another via the bus 210.

The host interface 208 includes a protocol for exchanging data with the host 100 connected to the storage device 200A or 200-1A and interfaces between the storage device 200A or 200-1A and the host 100. The host interface 208 may be embodied as an advanced technology attachment (ATA) interface, a serial advanced technology attachment (SATA) interface, a parallel advanced technology attachment (PATA) interface, a universal serial bus (USB) or a serial attached small computer system (SAS) interface, a small computer system interface (SCSI), an embedded multimedia card (EMMC) interface, or a universal flash storage (UFS) interface. However, the disclosure is not limited thereto. The host interface 208 may perform an I/O processing operation with the host 100 under the control of the CPU 204A.

The memory interface 209 is electrically connected to the memory device 220A or 250A. The memory interface 209 performs an I/O processing operation with the memory device 220A or 250A under the control of the CPU 204A. The memory interface 209 may be configured to support a NAND flash memory device or a NOR flash memory device. The memory interface 209 may also be configured to perform interleaving operations via a plurality of channels.

Data and program codes received from the memory device 220A or 250A via the memory interface 209 may be stored in the RAM 207. Furthermore, data received from the host 100 via the host interface 208 may be stored in the RAM 207. Data to be written to the memory device 220A or 250A is stored in a write cache buffer (WCB) 207-1 of the RAM 207.

The CPU 204A may control overall operations of the storage device 200A or 200-1A by using program codes and data stored in the RAM 207. For example, the CPU 204A performs an operation for transforming an I/O request received from the host 100 into a command that may be processed by the memory device 220A or 250A. Here, an operation for transforming a logical address included in the I/O request into a physical address of the memory device 220A or 250A is also performed. For example, the CPU 204A issues a command for performing a read operation or a write operation page-by-page to a flash memory device constituting the memory device 220A or 250A.

One or more I/O requests received from the host 100 via the host interface 208 are sequentially stored in the request queue 205. For example, an I/O request may include a write request or a read request. Furthermore, an I/O request may be defined as a command code. Therefore, the request queue 205 may store a write command code or a read command code.

For example, if a write request is received from the host 100, a write command code, information regarding a start logical block address (LBA), and information regarding the number of LBAs on which to perform write operations may be stored in the request queue 205.

An I/O request stored in the request queue 205 is in a format that may not be directly processed by the memory device 220A or 250A including flash memory devices, for example.

Therefore, the CPU 204A reads out an I/O request stored in the request queue 205 and divides the I/O request into sub-requests that may be processed by the memory device 220A or 250A. For example, sub-requests may be temporarily stored in a register of the CPU 204A.

Furthermore, the CPU 204A transforms logical addresses of the sub-requests into physical addresses that may be recognized by the memory device 220A or 250A. For example, an I/O request may be divided into sub-requests in a format with which a program operation and/or a read operation may be performed at flash memory devices. The size of a sub-request may be defined by pages that may be independently processed by flash memory devices constituting the memory device 220A or 250A. For example, a sub-request may include a command code and a logical page number.

The CPU 204A transforms logical pages numbers allocated to sub-requests divided from an I/O request into physical page numbers of a flash memory device. The sub-requests transformed into the physical page numbers are sequentially stored in the command queue 206.

The collecting unit 201 performs an operation for collecting information regarding one or more factors indicating a resource management status related to a data read operation or a data write operation. For example, if a plurality of channels are formed in a memory device, the collecting unit 201 may collect information regarding one or more factors indicating a resource management status in each of the channels. The storage structure of data collected by the collecting unit 201 is exemplified in FIG. 16.

Figure 16:
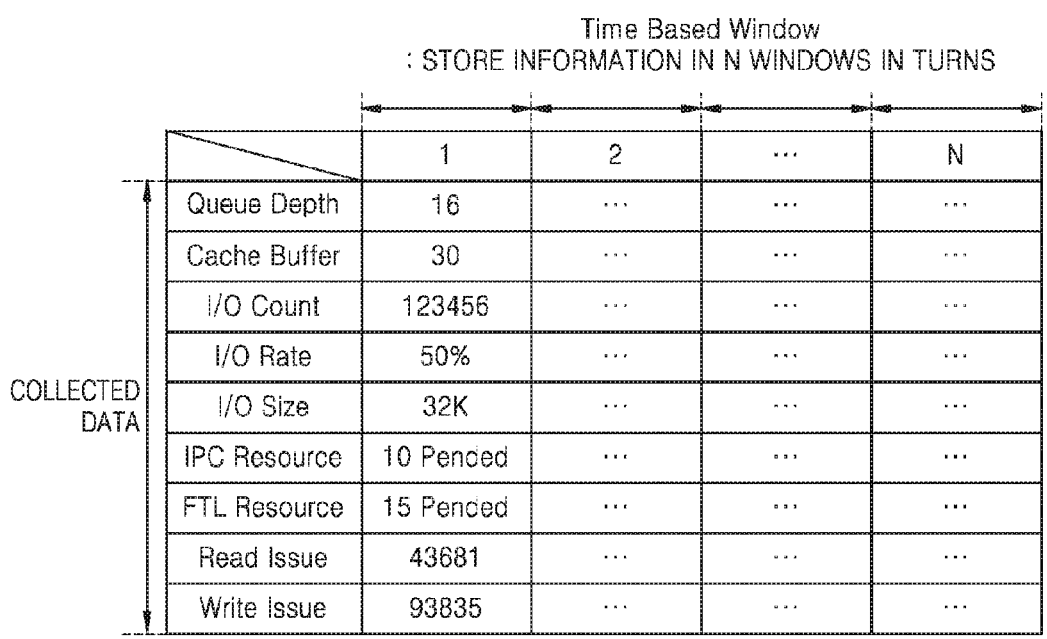
FIG. 16 is an example of storage type for information collected by a collecting unit shown in FIGS. 2A and 2B.

Referring to FIG. 16, information regarding one or more factors indicating a resource management status may include at least one of information regarding a queue depth, information regarding a cache buffer, information regarding an I/O count, information regarding an I/O rate, information regarding an I/O size, information regarding IPC resources, information regarding FTL resources, information regarding read issues, and information regarding write issues. Information as stated above is collected at a window of each period of an initially set unit time and collected information is sequentially stored at set N (N is an integer equal to or greater than 2) windows in turns.

For example, if information regarding a queue depth has a value 16, I/O requests may be transmitted from the host 100 to the storage device 200A by using 16 ports. If information regarding a cache buffer has a value of 30, it means that stored data occupies 30% of the total storage capacity of the WCB 207-1. Information regarding an I/O count may include a read I/O count. Information regarding an I/O rate is a value obtained by dividing a read I/O count by a sum of the read I/O count and a write I/O count. Information regarding IPC resources indicates the number of resources used for communication between processors when the CPU 204A is a multi-core processor. Information regarding FTL resources indicates the number of resources used for transforming logical addresses into physical addresses. Information regarding read issues indicates the number of read commands issued to the memory device 220A, whereas information regarding write issues indicates the number of write commands issued to the memory device 220A. Here, write commands are substantially identical to program commands in a flash memory device.

The calculating unit 202 performs an operation for calculating a read anticipation time based on information regarding one or more factors collected by the collecting unit 201. For example, the calculating unit 202 calculates moving average values of information regarding factors collected via respective windows, as shown in FIG. 16, and may calculate a read anticipation time tRA based on the moving average values, as shown in FIG. 17.

Figure 17:
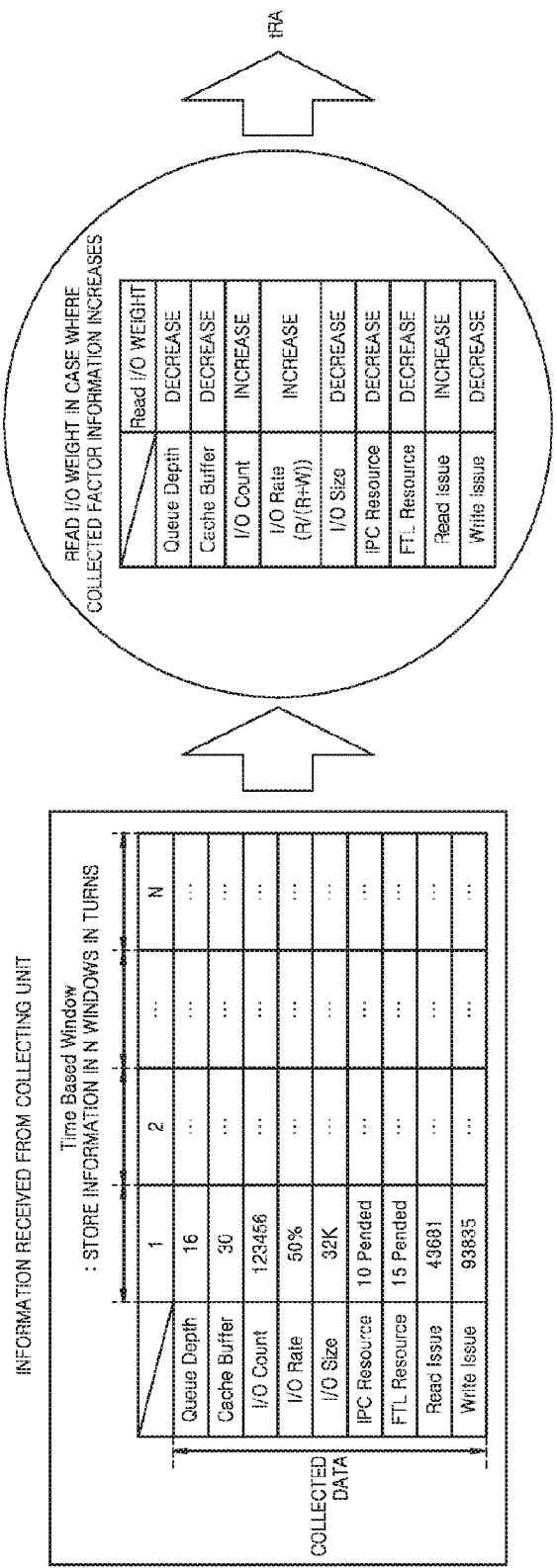
FIG. 17 is a diagram for describing an example of I/O processing operations in a calculating unit shown in FIGS. 2A and 2B.

Referring to FIG. 17, the calculating unit 202 increases a read anticipation time tRA as information regarding a queue depth, information regarding a cache buffer, information regarding an I/O size, information regarding IPC resources, information regarding FTL resources, or information regarding write issues decreases. On the contrary, the calculating unit 202 reduces a read anticipation time tRA as the information regarding the cache buffer, information regarding the I/O size, information regarding the IPC resources, information regarding the FTL resources, or information regarding the write issues increases.

Furthermore, the calculating unit 202 increases a read anticipation time tRA as information regarding a read I/O count, information regarding an I/O rate, or information regarding read issues increases. On the contrary, the calculating unit 202 reduces a read anticipation time tRA as the information regarding the read I/O count, information regarding the I/O rate, or information regarding the read issues decreases.

Here, increasing a read anticipation time tRA means increasing a weight for read I/O. The calculating unit 202 may set different weights for respective factors and calculate a read anticipation time tRA. For example, a weight may be set based on an experiment or a ratio based on a tendency between factors adjacent to one another.

Therefore, a read anticipation time tRA may be adjusted based on changes in information regarding one or more factors indicating a resource management status.

In another example, the calculating unit 202 performs operations for calculating a read anticipation time and I/O priorities based on information regarding one or more factors collected by the collecting unit 201. For example, the calculating unit 202 calculates moving average values of information regarding factors collected via respective windows as shown in FIG. 16 and may calculate a read anticipation time tRA and I/O priorities based on the moving average values as shown in FIG. 18.

First, the calculating unit 202 may calculate a read anticipation time tRA as described above with reference to FIG. 17. Next, the calculating unit 202 calculates priority table information, as shown in FIG. 18.

Figure 18:
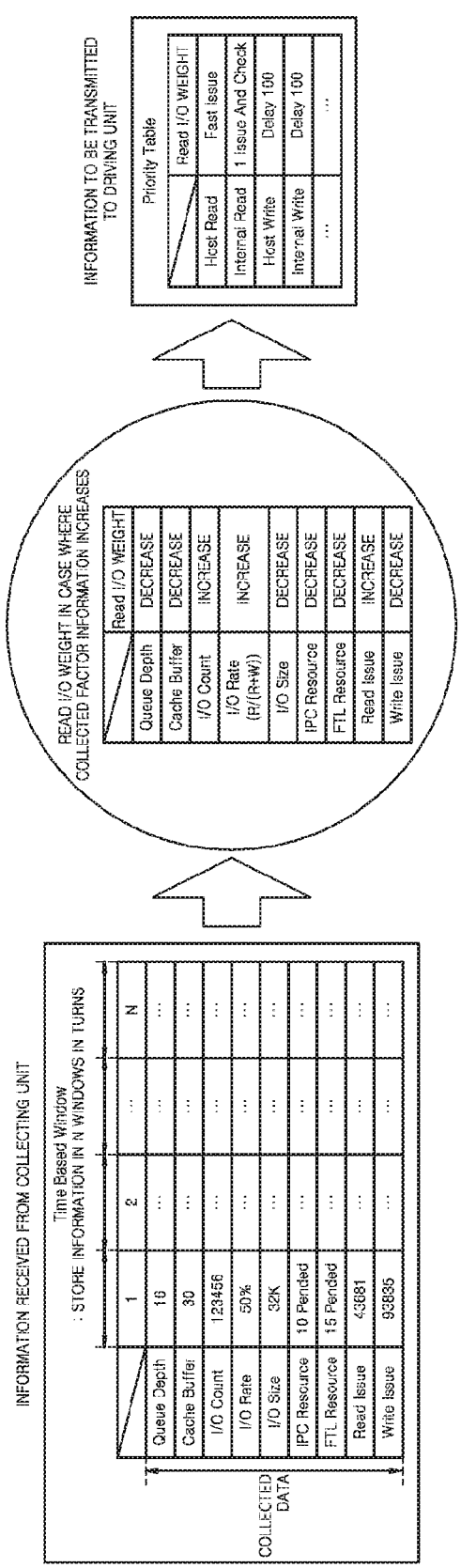
FIG. 18 a diagram for describing another example of I/O processing operations at the calculating unit shown in FIGS. 2A and 2B.

Referring to FIG. 18, a host read command requested by a host is issued at the highest priority, an internal read command is issued at the second-highest priority, a host write command requested by the host is issued at the third-highest priority after being delayed by 100 unit times, and an internal write command is issued at the fourth-highest priority after being delayed by 200 unit times. For example, the unit time may be in msec, usec, or nsec.

An internal read command and an internal write command are issued to perform a garbage collection in the storage device 200A. For example, a delay time for issuing a host write command may be determined based on a read anticipation time tRA, and a delay time for issuing an internal write command may be determined by multiplying the read anticipation time tRA by an initially-set factor. FIG. 18 shows a case in which twice a read anticipation time tRA is determined as a delay time for issuing an internal write command.

The driving unit 203 performs an I/O processing operation to postpone issuance of a program command to the memory device 220A or 250A in a period from completion of a read operation to a read anticipation time tRA and issues the postponed program command at a time point at which the read anticipation time tRA has elapsed. For example, if a plurality of channels are formed between the memory controller 210A' or 240A' and the memory device 220A or 250A, the driving unit 203 may perform an I/O processing operation to postpone issuance of a program command based on the read anticipation time tRA adjusted with respect to each of the channels. For example, the driving unit 203 may postpone issuance of a program command by performing a dummy I/O processing operation.

The driving unit 203 may determine priorities of commands to be issued from the command queue 206 based on a read anticipation time calculated by the calculating unit 202 and information regarding priorities of I/Os and may perform an I/O processing operation to postpone issuance of a program command.

For example, the driving unit 203 issues a read command from the command queue 206 in the order stored in the command queue 206 and postpones issuance of a program command in a period from completion of a read operation to a read anticipation time tRA. In other words, even if a program command before a read command is stored in the command queue 206, the read command is issued at higher priority than the program command in a period from completion of a read operation to a read anticipation time tRA.

For example, in periods other than a period from completion of a read operation to a read anticipation time tRA, the driving unit 203 issues commands in the order stored in the command queue 206 regardless of the types of commands and transmits issued commands to the memory device 220A or 250A via the memory interface 209.

For example, the collecting unit 201, the calculating unit 202, and the driving unit 203 may be embodied as software modules. In another example, the collecting unit 201, the calculating unit 202, and the driving unit 203 may also be embodied as hardware modules.

The CPU 204A may be embodied as a processor including one or more components from among the collecting unit 201, the calculating unit 202, the driving unit 203, the request queue 205, the command queue 206, the host interface 208, and the memory interface 209. For example, a single chip may be designed to include the CPU 204A, the collecting unit 201, the calculating unit 202, the driving unit 203, the request queue 205, the command queue 206, the host interface 208, and the memory interface 209. In another example, a single chip may be designed to include the collecting unit 201, the calculating unit 202, the request queue 205, and the command queue 206.

Figure 8:
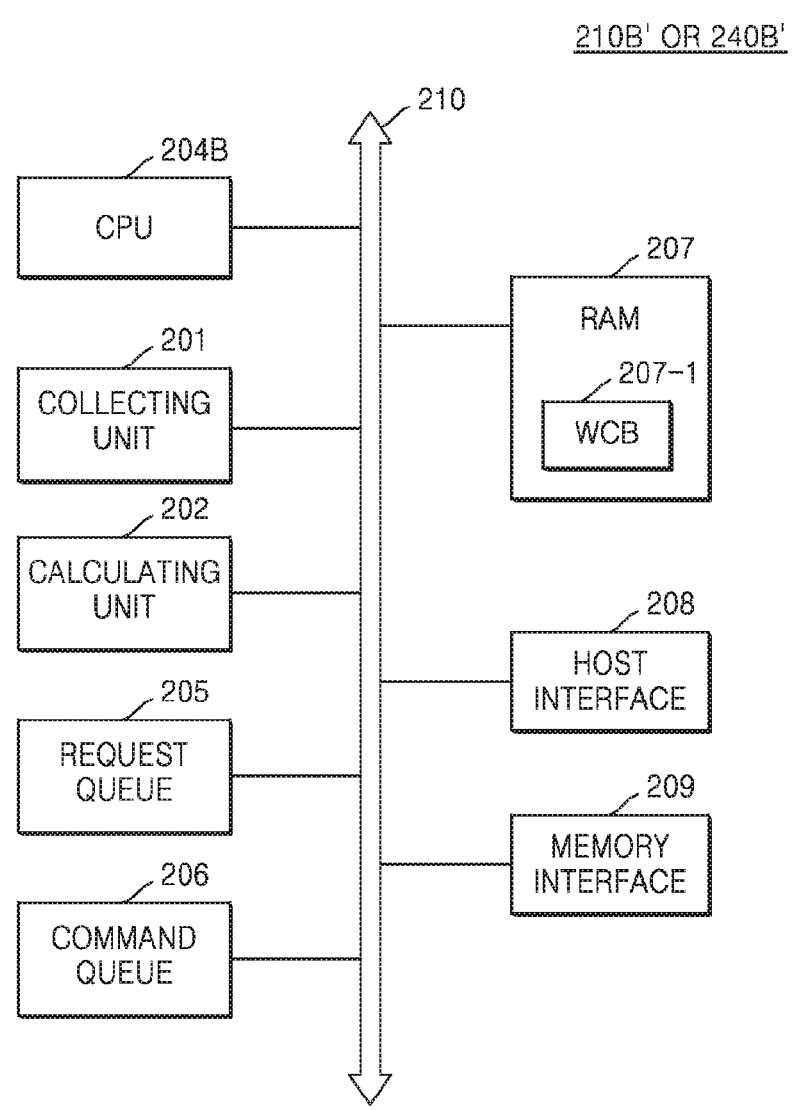
FIG. 8 is a diagram showing an example of the memory controllers shown in FIGS. 2B and 6.

FIG. 8 is a diagram showing an example of a memory controller 210B' or 240B' as the memory controllers 210B and 240B shown in FIGS. 2B and 6.

Referring to FIG. 8, the memory controller 210B' or 240B' includes a CPU 204B, the collecting unit 201, the calculating unit 202, the request queue 205, the command queue 206, the RAM 207, the host interface 208, the memory interface 209, and the bus 210. The components of the memory controller 210B' or 240B' may be electrically connected to one another via the bus 210.

Since the collecting unit 201, the calculating unit 202, the request queue 205, the command queue 206, the RAM 207, the host interface 208, and the memory interface 209 are described above with reference to FIG. 7, repeated descriptions thereof are omitted.

Unlike the memory controller 210A' or 240A' shown in FIG. 7, the memory controller 210B' or 240B' shown in FIG. 8 has a configuration without the driving unit 203.

The CPU 204B may control overall operations of the storage device 200B or 200-1B by using program codes and data stored in the RAM 207. For example, the CPU 204B performs an operation for transforming an I/O request received from the host 100 into a command that may be processed by the memory device 220B or 250B. Here, an operation for transforming a logical address included in the I/O request into a physical address of the memory device 220B or 250B is also performed. For example, the CPU 204B issues a command for performing a read operation or a write operation page-by-page to a flash memory device constituting the memory device 220B or 250B.

The CPU 204B sequentially issues commands in the order stored in the command queue 206 and transmits the issued commands to the memory device 220B or 250B. In detail, the CPU 204B sequentially issues commands to the memory device 220B or 250B via the memory interface 209 in the order stored in the command queue 206 regardless of a read anticipation time tRA after a read operation or a program operation is completed.

For example, the memory controller 210B' or 240B' transmits information regarding a read anticipation time tRA calculated by the calculating unit 202 to the memory device 220B or 250B via the memory interface 209. For example, if a plurality of channels are formed in a memory device, the CPU 204B may transmit information regarding a read anticipation time tRA regarding respective channels to the memory device 220B or 250B via the memory interface 209. For example, the CPU 204B may transmit information regarding a read anticipation time tRA regarding respective channels to the memory device 220B or 250B via the memory interface 209 by using commands.

In another example, the CPU 204B transmits a read anticipation time tRA calculated by the calculating unit 202 and information regarding priorities of I/Os to the memory device 220B or 250B via the memory interface 209. For example, if a plurality of channels are formed in a memory device, the CPU 204B may transmit information regarding a read anticipation time tRA regarding respective channels and information regarding priorities of I/Os to the memory device 220B or 250B via the memory interface 209. For example, the CPU 204B may transmit information regarding a read anticipation time tRA regarding respective channels and information regarding priorities of I/Os to the memory device 220B or 250B via the memory interface 209 by using commands.

Figure 9:
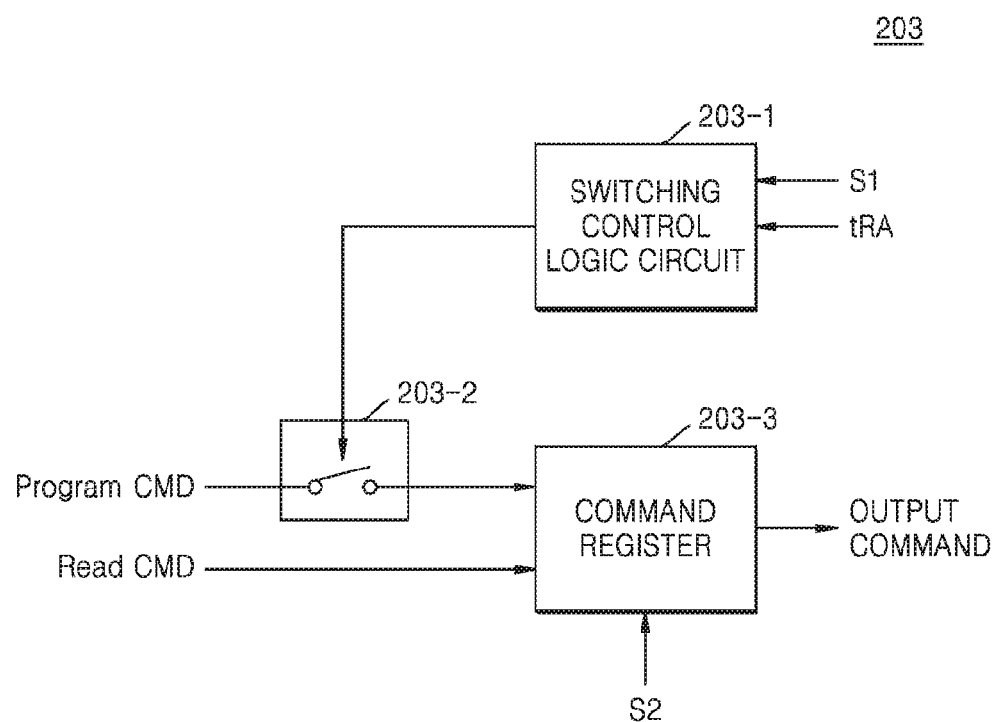
FIG. 9 is a diagram showing an example of hardware configuration of a driving unit shown in FIGS. 1 and 7.

FIG. 9 is a diagram showing an example of a hardware configuration of the driving unit 203 shown in FIGS. 1 and 7.

Referring to FIG. 9, the driving unit 203 includes a switching control logic circuit 203-1, a switching circuit 203-2, and a command register 203-3.

The switching control logic circuit 203-1 receives inputs of a first status signal 51 and information regarding a read anticipation time tRA. The switching control logic circuit 203-1 counts time from a time point at which the first status signal 51 is input and determines whether a counted time has reached the read anticipation time tRA. For example, the first status signal 51 may be transmitted from the CPU 204A. The switching control logic circuit 203-1 generates a first control signal if a counted time has not reached the read anticipation time tRA and generates a second control signal if a counted time has reached the read anticipation time tRA.

The switching circuit 203-2 blocks a program command from being issued by the command queue 206 and input to the command register 203-3 in a period during which a first control signal is input from the switching control logic circuit 203-1. The switching circuit 203-2 does not block a program command from being issued by the command queue 206 and input to the command register 203-3 in a period during which a second control signal is input from the switching control logic circuit 203-1.

Therefore, the command register 203-3 may prevent a program command from being stored in a period during which a first control signal is input. Furthermore, the command register 203-3 stores a read command issued by the command queue 206 regardless of a first control signal and a second control signal.

When a second status signal S2 is input indicating that the I/O state is ready, the command register 203-3 outputs a command stored in the command register 203-3. For example, the second status signal S2 may be transmitted from the CPU 204A.

For example, when the second status signal S2 is input, a command stored in the command register 203-3 is then transmitted to the memory device 220B or 250B via the memory interface 209. If the second status signal S2 indicates that the I/O state is busy, the command register 203-3 does not issue a command.

For example, if a plurality of channels are formed between the memory controller 210A' or 240A' and the memory device 220A or 250A, the number of driving units 203, as the one shown in FIG. 9, arranged at the memory controller 210A' or 240A' may be identical to the number of channels.

Figure 10:
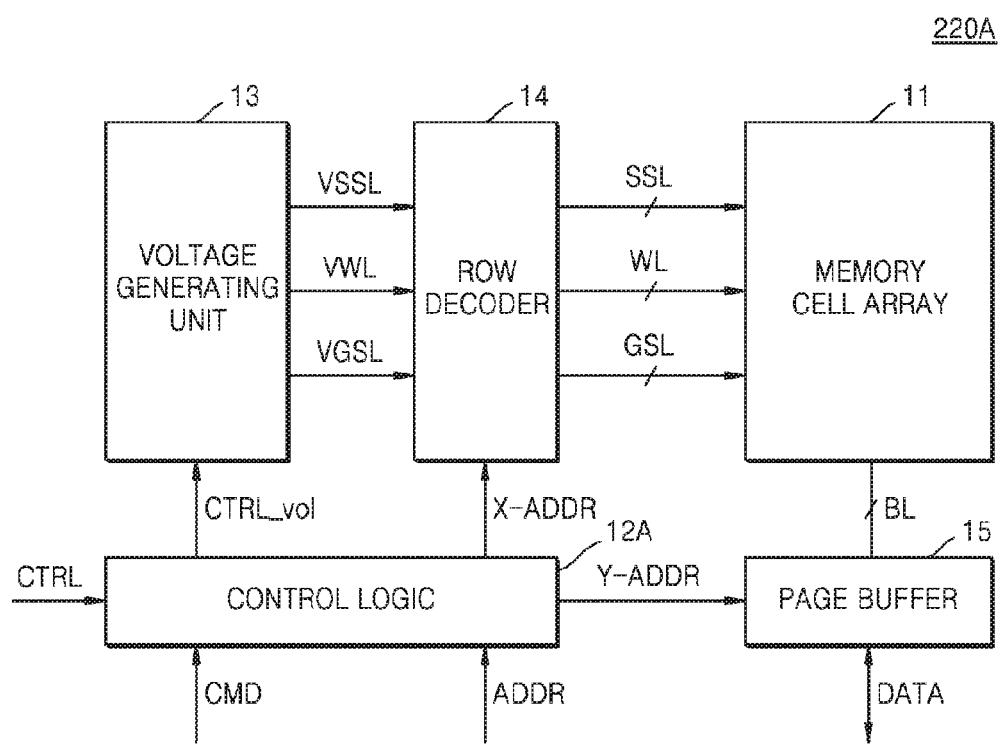
FIG. 10 is a diagram showing an example configuration of the memory device shown in FIG. 2A.

FIG. 10 is a diagram showing an example configuration of the memory device 220A shown in FIG. 2A.

Referring to FIG. 10, the memory device 220A may include a memory cell array 11, a control logic 12A, a voltage generating unit 13, a row decoder 14, and a page buffer 15. Hereinafter, the components included in the memory device 220A will be described below in detail.

The memory cell array 11 may be connected to one or more string selecting lines SSL, a plurality of word lines WL, and one or more ground selecting lines GSL and may also be connected to a plurality of bit lines BL. The memory cell array 11 may include a plurality of memory cells (MC of FIG. 13) arranged at regions at which the plurality of word lines WL and the plurality of bit lines BL intersect.

The plurality of memory cells MC are turned into an erase state when an erase voltage is applied to the memory cell array 11, whereas the plurality of memory cells MC are turned into a program state when a program voltage is applied to the memory cell array 11. Here, each of the memory cells MC may have one from among an erase state and first through $n^{th}$ program states P1 through Pn based on a threshold voltage thereof.

Here, n may be a natural number equal to or greater than 2. For example, if the memory cell MC is a 2-bit level cell, n may be 3. In another example, if the memory cell MC is a 3-bit level cell, n may be 7. In another example, if the memory cell MC is a 4-bit level cell, n may be 15. As described above, the plurality of memory cells MC may include multi-level cells. However, the disclosure is not limited thereto, and the plurality of memory cells MC may include single-level cells.

The control logic 12A may output various control signals for writing data to the memory cell array 11 or reading out data from the memory cell array 11 based on a command CMD, an address ADDR, and a control signal CTRL received from the memory controller 210A. Therefore, the control logic 12A may control the overall operations of the memory device 220A.

Various control signals output by the control logic 12A may be provided to the voltage generating unit 13, the row decoder 14, and the page buffer 15. In detail, the control logic 12A may provide a voltage control signal CTRL_vol to the voltage generating unit 13, may provide a row address X_ADDR to the row decoder 14, and may provide a column address Y_ADDR to the page buffer 15.

The voltage generating unit 13 may generate various voltages for performing a program operation, a read operation, and an erase operation with respect to the memory cell array 11 based on the voltage control signal CTRL_vol. In detail, the voltage generating unit 13 may generate a first driving voltage VWL for driving the plurality of word lines WL, a second driving voltage VSSL for driving the plurality of string selecting lines SSL, and a third driving voltage VGSL for driving the plurality of ground selecting lines GSL.

Here, the first driving voltage VWL may be a program voltage (or a write voltage), a read voltage, an erase voltage, a pass voltage, or a program verify voltage. Furthermore, the second driving voltage VSSL may be a string selecting voltage, that is, an ON voltage or an OFF voltage. Furthermore, the third driving voltage VGSL may be a ground selecting voltage, that is, an ON voltage or an OFF voltage.

According to the present embodiment, based on the voltage control signal CTRL_vol, when a program loop starts, that is, the number of program loops is 1, the voltage generating unit 13 may generate a program start voltage as a program voltage. Furthermore, as the number of program loops increases, the voltage generating unit 13 may generate voltages increasing by stages by a step voltage from the program start voltage as program voltages.

The row decoder 14 may be connected to the memory cell array 11 via the plurality of word lines WL and may activate some of the plurality of word lines WL in response to a row address X_ADDR received from the control logic 12A. In detail, during a read operation, the row decoder 14 may apply a read voltage to a selected word line and apply a pass voltage to unselected word lines.

Meanwhile, during a program operation, the row decoder 14 may apply a program voltage to a selected word line and apply a pass voltage to unselected word lines. According to the present embodiment, in at least one of program loops, the row decoder 14 may apply a program voltage to a selected word line and an additionally selected word line.

The page buffer 15 may be connected to the memory cell array 11 via the plurality of bit lines BL. In detail, during a read operation, the page buffer 15 may function as a sense amplifier and output data DATA stored in the memory cell array 11. Meanwhile, during a program operation, the page buffer 15 may function as a write driver and input data DATA to store to the memory cell array 11.

Figure 11:
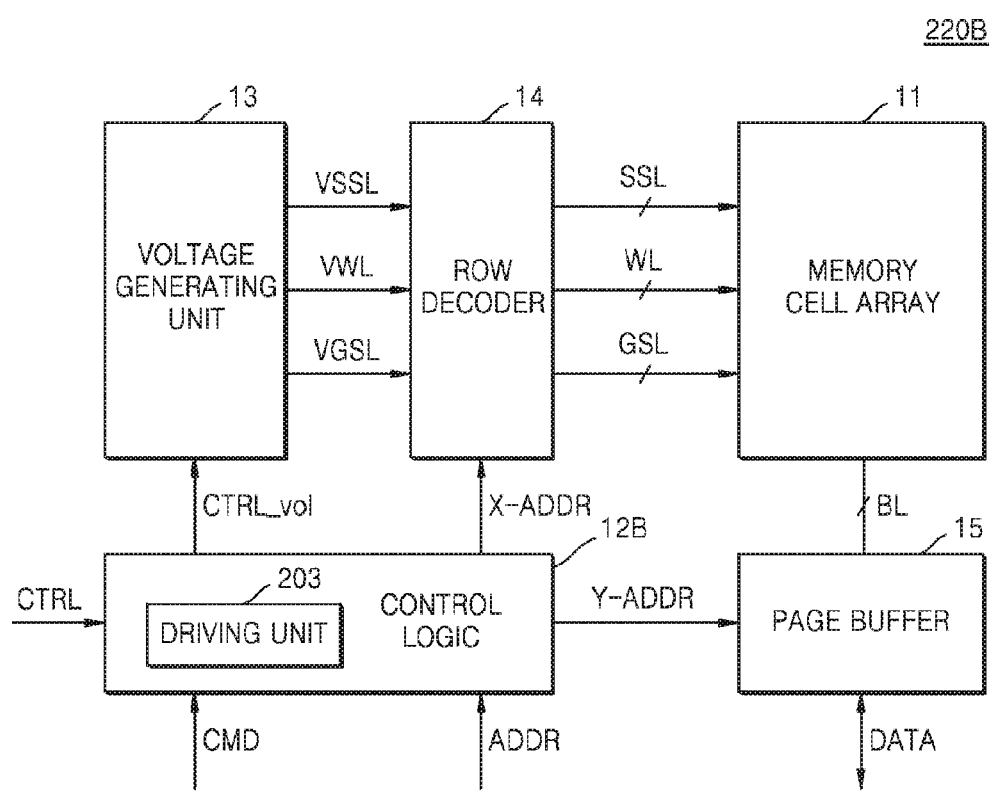
FIG. 11 is a diagram showing an example configuration of the memory device shown in FIG. 2B.

FIG. 11 is a diagram showing an example configuration of the memory device 220B shown in FIG. 2B.

Referring to FIG. 11, the memory device 220B may include the memory cell array 11, a control logic 12B, the voltage generating unit 13, the row decoder 14, and the page buffer 15.

Since the memory cell array 11, the voltage generating unit 13, the row decoder 14, and the page buffer 15 are described above in detail with reference to FIG. 10, repeated descriptions thereof are omitted.

The control logic 12B may output various control signals for writing data to the memory cell array 11 or reading out data from the memory cell array 11 based on a command CMD, an address ADDR, and a control signal CTRL received from the memory controller 210A. Therefore, the control logic 12B may control the overall operations of the memory device 220B.

The control logic 12B includes the driving unit 203. The driving unit 203 included in the control logic 12B generates a read control signal based on a read command received from the memory controller 210B. Furthermore, the driving unit 203 postpones generation of a program control signal for processing a program command received from the memory controller 210B based on information regarding a read anticipation time tRA received from the memory controller 210B.

Therefore, the control logic 12B may postpone the generation of a program control signal for processing a program command received from the memory controller 210B and generate a read control signal for processing a read command at a higher priority than a write command in a period from completion of a read operation until a read anticipation time tRA has elapsed. Furthermore, after a read anticipation time tRA has elapsed after a time point at which a read operation is completed, the control logic 12B may generate a program control signal or a read control signal based on an order in which commands are received from the memory controller 210B.

Therefore, in a period from completion of a read operation until a read anticipation time tRA has elapsed, the memory device 220B postpones a program command processing and processes a read command at higher priority than a write command. In other words, in a period from completion of a read operation until a read anticipation time tRA has elapsed, even if a program command is received before a read command, the read command is processed at higher priority than the write command.

Figure 12:
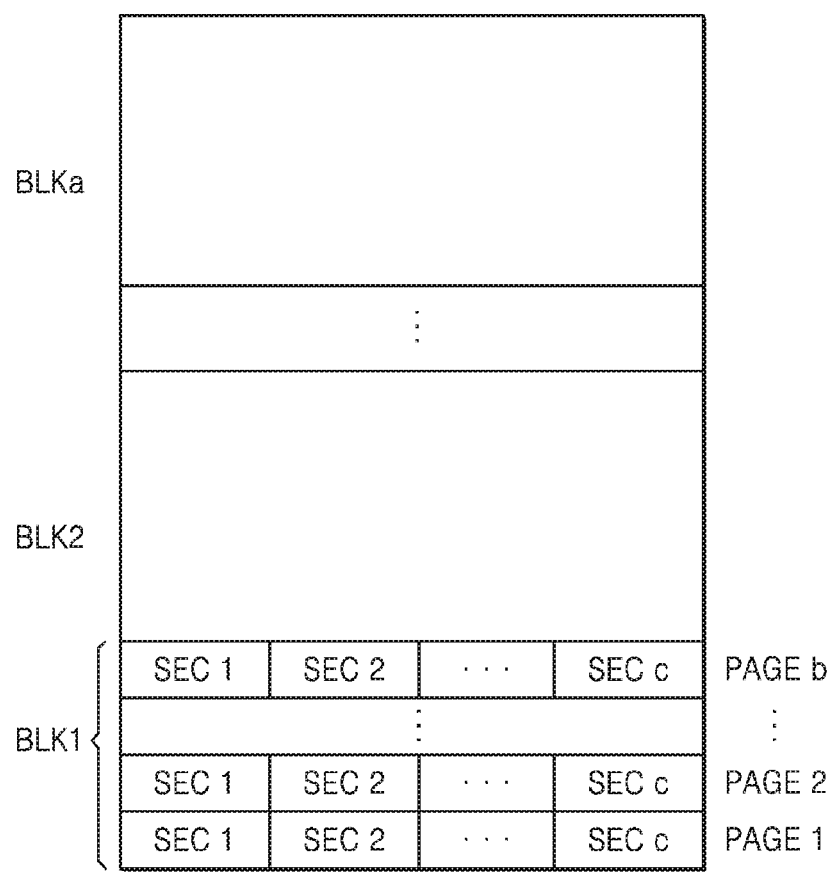
FIG. 12 is a diagram showing an example of a memory cell array shown in FIGS. 10 and 11.

FIG. 12 is a diagram showing an example of the memory cell array 11 shown in FIGS. 10 and 11.

Referring to FIG. 12, the memory cell array 11 may be a flash memory cell array. Here, the memory cell array 11 may include a memory blocks BLK1 through BLKa (a is an integer equal to or greater than 2), each of the memory blocks BLK1 through BLKa may include b (b is an integer equal to or greater than 2) pages PAGE1 through PAGEb, and each of the pages PAGE1 through PAGEb may include c (c is an integer equal to or greater than 2) sectors SEC1 through SECc. For convenience of explanation, FIG. 12 shows the pages PAGE1 through PAGEb and the sectors SEC1 through SECc with respect to the memory block BLK1 only. However, the other memory blocks BLK2 through BLKa may have the same structure as the memory block BLK1.

Figure 13:
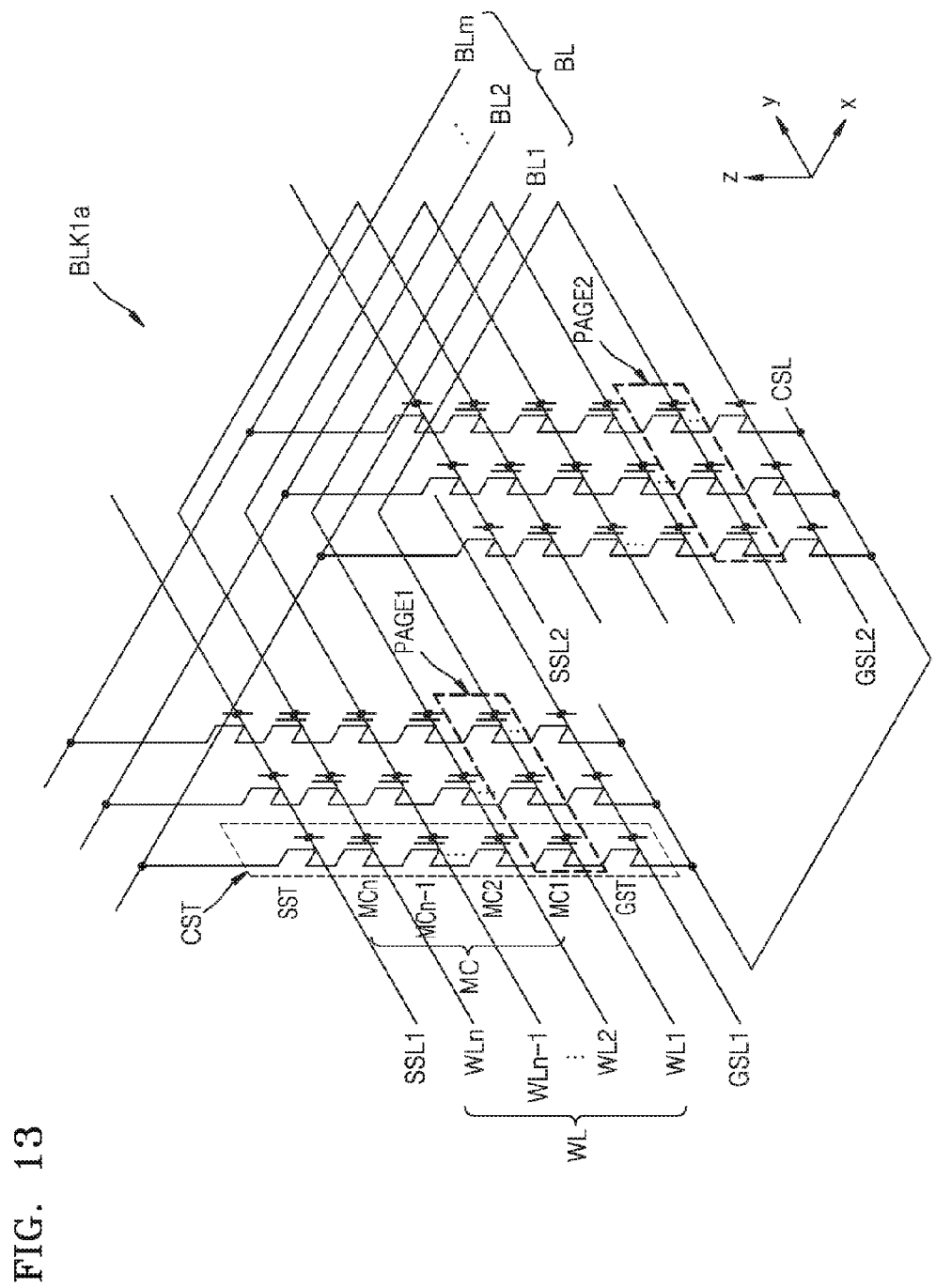
FIG. 13 is a circuit diagram showing an example of a first memory block included in the memory cell array shown in FIGS. 10 and 11.

FIG. 13 is a circuit diagram showing an example of a first memory block BLK1a included in the memory cell array 11 shown in FIGS. 10 and 11.

Referring to FIG. 13, the first memory block BLK1a may be a vertical-type NAND flash memory. Here, the respective memory blocks BLK1 through BLKa shown in FIG. 12 may be embodied in the structure as shown in FIG. 13. In FIG. 13, a first direction will be referred to as an x direction, a second direction will be referred to as a y direction, and a third direction will be referred to as a z direction. However, the disclosure is not limited thereto, and the first through third directions may be defined otherwise.

The first memory block BLK1a may include a plurality of cell strings CST, a plurality of word lines WL, a plurality of bit lines BL, a plurality of ground selecting lines GSL1 and GSL2, a plurality of string selecting lines SSL1 and SSL2, and a common selecting line CSL. Here, the number of cell strings CST, the number of word lines WL, the number of bit lines BL, the number of ground selecting lines GSL1 and GSL2, and the number of string selecting lines SSL1 and SSL2 may vary according to embodiments. Each of the cell strings CST may include a string selecting transistor SST, a plurality of memory cells MC, and a ground selecting transistor GST connected between a bit line BL and the common selecting line CSL in series. However, the disclosure is not limited thereto. According to another embodiment, the cell strings CST may further include at least one dummy cell. According to another embodiment, the cell strings CST may include at least two string selecting transistors SST or at least two ground selecting transistors GST.

Furthermore, the cell strings CST may extend in the third direction (z direction), and more particularly, may extend in a direction perpendicular to a substrate (z direction). Therefore, the memory block BLK1a including the cell strings CST may be referred to as a vertical-type NAND flash memory. As described above, by extending the cell strings CST in a direction perpendicular to a substrate (z direction), integration of the memory cell array 11 may be increased.

The plurality of word lines WL may extend in the first direction (x direction) and the second direction (y direction), where the word lines WL may be connected to corresponding memory cells MC, respectively. Therefore, the plurality of memory cells MC arranged next to one another in the first direction (x direction) and the second direction (y direction) on the same layer may be connected to the same word line WL. In detail, each of the word lines WL may be connected to a gate of a memory cell MC and control the corresponding memory cell MC. Here, the plurality of memory cells MC may store data, where the plurality of memory cells MC may be programmed, read out, or erased under the control of the word line WL connected thereto.

The plurality of bit lines BL may extend in the first direction (x direction) and be connected to the string selecting transistors SST. Therefore, the plurality of string selecting transistors SST arranged next to one another in the first direction (x direction) may be connected to the same bit line BL. In detail, each of the bit lines BL may be connected to a drain of the string selecting transistor SST.

The plurality of string selecting lines SSL1 and SSL2 may extend in the second direction (y direction) and be connected to the string selecting transistors SST. Therefore, the plurality of string selecting transistors SST arranged next to one another in the second direction (y direction) may be connected to the same string selecting line SSL1 or SSL2. In detail, each of the string selecting lines SSL1 and SSL2 may be connected to a gate of the string selecting transistor SST and control the corresponding string selecting transistor SST.

The plurality of ground selecting lines GSL1 and GSL2 may extend in the second direction (y direction) and be connected to the ground selecting transistors GST. Therefore, the plurality of ground selecting transistors GST arranged next to one another in the second direction (y direction) may be connected to the same ground selecting line GSL1 or GSL2. In detail, each of the ground selecting lines GSL1 and GSL2 may be connected to a gate of the ground selecting transistor GST and control the corresponding ground selecting transistor GST.

Furthermore, the ground selecting transistors GST included in the cell strings CST may be connected to the common selecting line CSL in common. In other words, the common selecting line CSL may be connected to sources of the ground selecting transistors GST.

Here, the plurality of memory cells MC, which are connected to the same word line WL and the same string selecting line SSL1 or SSL2 in common and are arranged next to one another in the second direction (y direction), may be referred to as a page PAGE. For example, the plurality of memory cells MC, which are connected to a first word line WL1 and a first string selecting line SSL1 in common and are arranged next to one another in the second direction (y direction), may be referred to as a first page PAGE1. Furthermore, the plurality of memory cells MC, which are connected to the first word line WL1 and a second string selecting line SSL2 in common and are arranged next to one another in the second direction (y direction), may be referred to as a second page PAGE2.

To perform a program operation with respect to the memory cells MC, 0V may be included in the bit line BL, an ON voltage may be included in the string selecting line SSL, and an OFF voltage may be included in the ground selecting line GSL. The ON voltage may be equal to or greater than a threshold voltage of the string selecting transistor SST to turn the string selecting transistor SST on, whereas the OFF voltage may be less than a threshold voltage of the ground selecting transistors GST to turn the ground selecting transistors GST off. Furthermore, a program voltage may be included in a selected memory cell MC from among the memory cells MC, whereas a pass voltage may be included in the remaining memory cells MC. When a program voltage is applied, charges may be injected into the memory cells MC based on F-N tunnelling. A pass voltage may be greater than threshold voltages of the memory cells MC.

To perform an erase operation with respect to the memory cells MC, an erase voltage may be included in bodies of the memory cells MC and 0V may be included in the word lines WL. Therefore, data of the memory cells MC may be erased at once.

Figure 14:
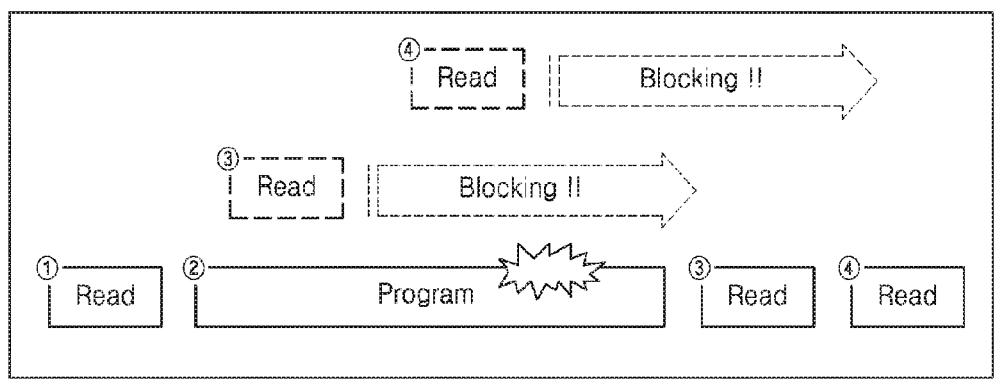
FIG. 14 is a diagram showing an example of I/O patterns at which performance deterioration occurs due to I/O blocking in a storage device.

FIG. 14 is a diagram showing an example of I/O patterns at which performance deterioration occurs due to I/O blocking in a storage device.

Referring to FIG. 14, a case of performing commands at a storage device in an order in which commands are requested by a host is shown. For example, if a host generated requests in the order of a read command $\hat{1}$→a program command $\hat{2}$→a read command $\hat{3}$→a read command $\hat{4}$, operations regarding the two read commands $\hat{3}$ and $\hat{4}$, which correspond to requests received while the program command $\hat{2}$ is being performed, are blocked. The phenomenon adversely affects a storage device employing a 3-dimensional (3D) vertical-type NAND flash (VNAND) memory device with a longer program time. In this case, due to insufficiency of resources of a flash memory, host resources may become sufficient.

In computing systems of various forms, a read operation and a write operation share resources from a host to a memory device, and thus they may affect I/Os between the host and the memory device. Therefore, due to insufficiency of host resources, there may be periods in which the resources of the memory device become sufficient, or vice versa.

A method of controlling I/Os according to the disclosure suggests to collect and analyze resources from a host to a memory device and to process I/Os to minimize an interaction between a read operation and a write operation. By minimizing the interaction between a read operation and a write operation, the performance and quality of service (QoS) of a computing system may be improved.

Figure 15:
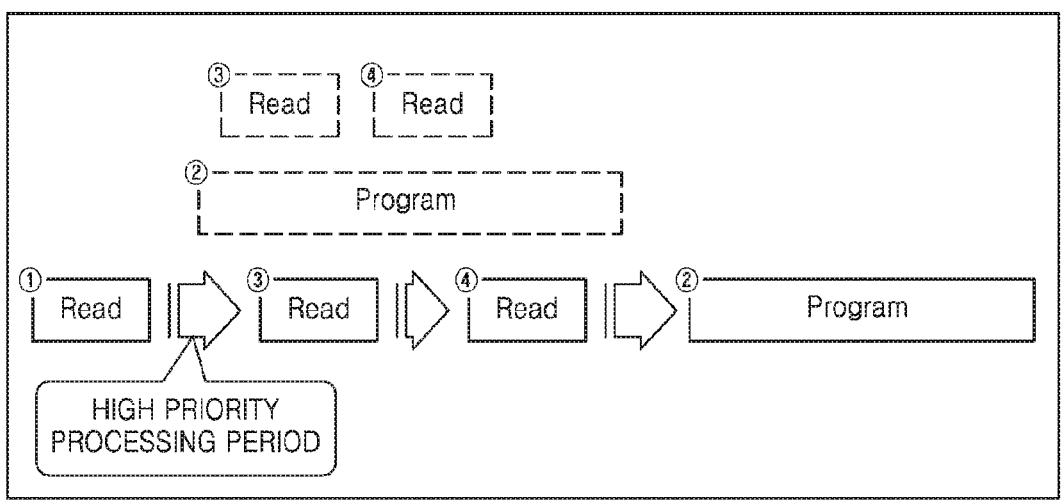
FIG. 15 is a diagram for describing a method of processing I/Os in a storage device, according to the disclosure.

FIG. 15 is a diagram for describing a method of processing I/Os in a storage device, according to the disclosure.

Referring to FIG. 15, the host 100 generates requests in the order of a read command $\hat{1}$→a program command $\hat{2}$→a read command $\hat{3}$→a read command $\hat{4}$.

The storage device 200 collects various information for optimizing performance from the host 100 to a memory device constituting the storage device 200, determines I/O priorities based on the collected information, and performs actual I/O processing operations according to the determined I/O priorities.

According to the disclosure, a read anticipation time tRA for optimizing performance is determined based on collected information, and then I/O priorities are determined as described below by using the determined read anticipation time tRA. For example, to prevent performance deterioration at a memory device with long program time, an operation regarding a program command is delayed based on a read anticipation time tRA, thereby allocating higher priority to an operation regarding a read command than an operation regarding a write command in a particular period.

For example, before a read anticipation time tRA is elapsed after completion of a read operation at the storage device 200, an I/O processing operation for performing a program command at the storage device 200 is postponed and higher priority is allocated for an I/O processing operation for performing a read command than an I/O processing operation for performing a write command.

It is assumed that a program command $\hat{2}$ and a read command $\hat{3}$ are sequentially received by the storage device 200 in a period from a time point, at which a read command $\hat{1}$ is performed, before a read anticipation time is elapsed. In this case, the program command $\hat{2}$, which is requested first, is postponed, and higher priority is allocated to the read command $\hat{3}$ than to the program command $\hat{2}$, which is requested later. Therefore, the storage device 200 performs the read command $\hat{3}$. It is assumed that a read $\hat{4}$ is received by the storage device 200 in a period from a time point, at which a read command $\hat{3}$ is performed, before a read anticipation time is elapsed. In this case, the program command $\hat{2}$, which is previously requested, is postponed, and higher priority is allocated to the read command $\hat{4}$, which is requested later, than the program command $\hat{2}$. Therefore, the storage device 200 performs the read command $\hat{4}$. Since no read command is received from the host 100 in a period from a time point, at which a read command $\hat{4}$ is performed, before a read anticipation time is elapsed, the storage device 200 performs the previously requested program command $\hat{2}$ at a time point at which the read anticipation time has elapsed.

Therefore, the storage device 200 performs the commands in the order of the read command $\hat{1}$, the read command $\hat{3}$, the read command $\hat{4}$, and the program command $\hat{2}$. Therefore, by performing read commands that may be I/O blocked during a long time period for performing a program command at higher priorities than the program command, performance deterioration may be minimized.

Figure 19:
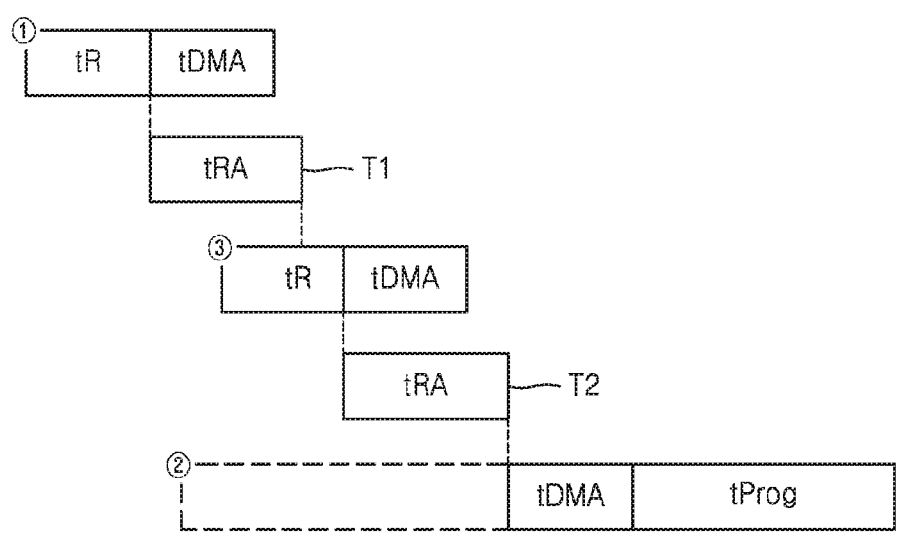
FIG. 19 is a diagram showing an example of I/O timing charts to which the method of processing I/Os in the storage device, according to the disclosure is applied.

FIG. 19 is a diagram showing an example of I/O timing charts to which the method of processing I/Os in the storage device 200, 200-1A, or 200-1B according to the disclosure is applied.

Referring to FIG. 19, requests are received by the storage device 200, 200-1A, or 200-1B in the order of a read command $\hat{1}$→a program command $\hat{2}$→a read command $\hat{3}$.

The storage device 200, 200-1A, or 200-1B performs a read operation for reading out data from the memory cell array 11 of the memory device 220A or 220B and storing the data in the page buffer 15 according to the read command $\hat{1}$ in a tR period. Next, to copy data stored in the page buffer 15 to the RAM 207 of the memory controller 210A' 240A', 210B' or 240B', a direct memory accessing operation is performed in a tDMA period.

After performing a read operation according to the read command $\hat{1}$ in the tR period, the storage device 200, 200-1A, or 200-1B postpones an operation regarding the program command $\hat{2}$ requested by the host 100 in a read anticipation time tRA period T1. Instead, the storage device 200, 200-1A, or 200-1B allocates higher I/O priority to the read command $\hat{3}$ that is requested later than the program command $\hat{2}$.

Therefore, the storage device 200, 200-1A, or 200-1B performs a read operation for reading out data from the memory cell array 11 of the memory device 220A or 220B according to the read command 3̂ and storing the data in the page buffer 15 in the tR period. Next, to copy data stored in the page buffer 15 to the RAM 207 of the memory controller 210A' 240A', 210B' or 240B', a direct memory accessing operation is performed in the tDMA period.

After the read operation according to the read command 3̂ is completed in the tR period and it is confirmed that no additional read command is received in a read anticipation time tRA period T2, the storage device 200, 200-1A, or 200-1B performs the postponed program command 2̂.

In other words, the storage device 200, 200-1A, or 200-1B performs a direct memory accessing operation for copying data stored in the write cache buffer 207-1 of the RAM 207 of the memory controller 210A' 240A', 210B' or 240B' to the page buffer 15 of the memory device 220A or 220B according to the program command 2̂ in the tDMA period. Next, an operation for programming data stored in the page buffer 15 to the memory cell array 11 of the memory device 220A or 220B is performed in a period tProg.

Therefore, the storage device 200, 200-1A, or 200-1B performs commands in the order of a read command 1̂→a read command 3̂→a program command 2̂.

Figure 20:
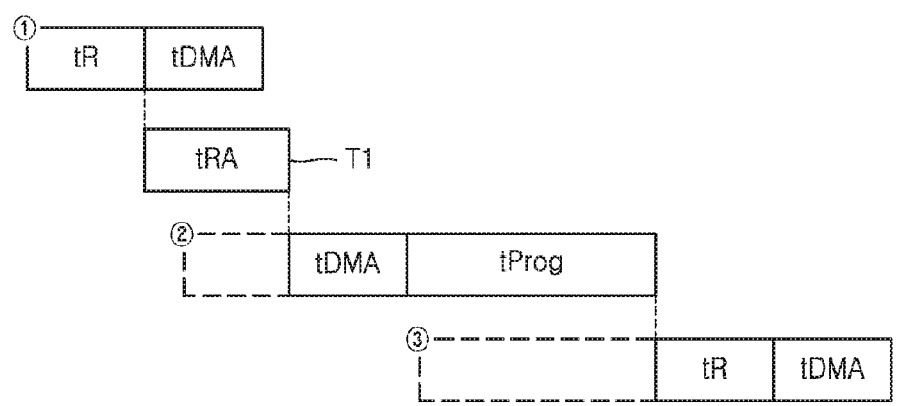
FIG. 20 is a diagram showing another example of I/O timing charts to which the method of processing I/Os in the storage device, according to the disclosure is applied.

FIG. 20 is a diagram showing another example of I/O timing charts to which the method of processing I/Os in the storage device 200, 200-1A, or 200-1B according to the disclosure is applied.

Referring to FIG. 20, requests are received by the storage device 200, 200-1A, or 200-1B in the order of a read command 1̂→a program command 2̂→a read command 3̂.

The storage device 200, 200-1A, or 200-1B performs a read operation for reading out data from the memory cell array 11 of the memory device 220A or 220B and storing the data in the page buffer 15 according to the read command 1̂ in a tR period. Next, to copy data stored in the page buffer 15 to the RAM 207 of the memory controller 210A' 240A', 210B' or 240B', a direct memory accessing operation is performed in a tDMA period.

After performing a read operation according to the read command 1̂ in the tR period, the storage device 200, 200-1A, or 200-1B postpones an operation regarding the program command 2̂ requested by the host 100 in a read anticipation time tRA period T1.

After it is confirmed that no additional read command is received in the read anticipation time tRA period T1, the storage device 200, 200-1A, or 200-1B performs the postponed program command 2̂. In detail, the storage device 200, 200-1A, or 200-1B performs a direct memory accessing operation for copying data stored in the write cache buffer 207-1 of the RAM 207 of the memory controller 210A' 240A', 210B' or 240B' to the page buffer 15 of the memory device 220A or 220B according to the program command 2̂ in the tDMA period. Next, an operation for programming data stored in the page buffer 15 to the memory cell array 11 of the memory device 220A or 220B is performed in a period tProg.

The storage device 200, 200-1A, or 200-1B postpones an operation regarding the read command 3̂ requested by the host 100 in a period for performing the program command 2̂ until a program operation according to the program command 2̂ is completed.

After the program operation according to the program command 2̂ is completed in the period tProg, the storage device 200, 200-1A, or 200-1B performs the postponed read command 3̂. In detail, the storage device 200, 200-1A, or 200-1B performs a read operation for reading out data from the memory cell array 11 of the memory device 220A or 220B and storing the data in the page buffer 15 according to the read command 3̂ in a tR period. Next, to copy data stored in the page buffer 15 to the RAM 207 of the memory controller 210A' 240A', 210B' or 240B', a direct memory accessing operation is performed in the tDMA period.

Figure 21:
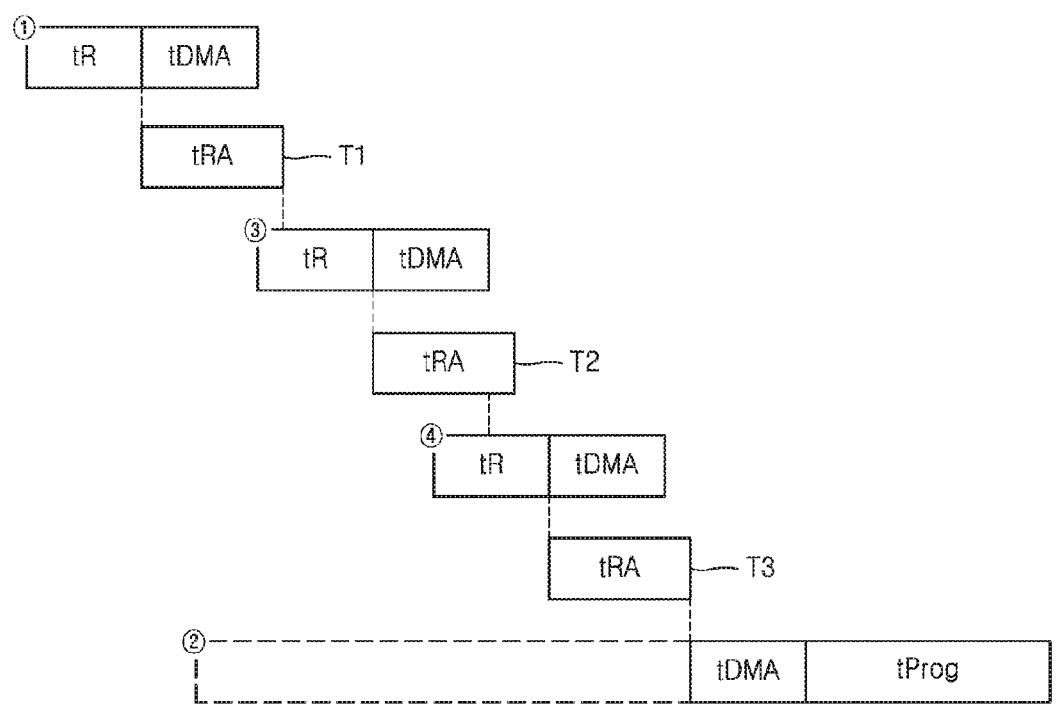
FIG. 21 is a diagram showing another example of I/O timing charts to which the method of processing I/Os in the storage device, according to the disclosure is applied.

FIG. 21 is a diagram showing another example of I/O timing charts to which the method of processing I/Os in the storage device 200, 200-1A, or 200-1B according to the disclosure is applied.

Referring to FIG. 21, requests are received by the storage device 200, 200-1A, or 200-1B in the order of a read command 1̂→a program command 2̂→a read command 3̂→a read command 4̂.

The storage device 200, 200-1A, or 200-1B performs a read operation for reading out data from the memory cell array 11 of the memory device 220A or 220B and storing the data in the page buffer 15 according to the read command 1̂ in a tR period. Next, to copy data stored in the page buffer 15 to the RAM 207 of the memory controller 210A' 240A', 210B' or 240B', a direct memory accessing operation is performed in a tDMA period.

After performing a read operation according to the read command 1̂ in the tR period, the storage device 200, 200-1A, or 200-1B postpones an operation regarding the program command 2̂ requested by the host 100 in a read anticipation time tRA period T1. In the read anticipation time tRA period T1, the storage device 200, 200-1A, or 200-1B allocates higher I/O priority to the read command 3̂ that is requested later than the program command 2̂.

Therefore, after the read operation according to the read command 1̂ is performed in the tR period, the storage device 200, 200-1A, or 200-1B performs a read operation for reading out data from the memory cell array 11 of the memory device 220A or 220B and storing the data in the page buffer 15 according to the read command 3̂ in the tR period. Next, to copy data stored in the page buffer 15 to the RAM 207 of the memory controller 210A' 240A', 210B' or 240B', a direct memory accessing operation is performed in the tDMA period.

When the read command 4̂ is requested by the host 100 in a read anticipation time tRA period T2 after the read operation according to the read command 3̂ is completed in the tR period, the storage device 200, 200-1A, or 200-1B allocates I/O priority to perform the read command 4̂ that is requested later than the program command 2̂ that is being postponed.

Therefore, after the read operation according to the read command 3̂ is completed in the tR period, the storage device 200, 200-1A, or 200-1B performs a read operation for reading out data from the memory cell array 11 of the memory device 220A or 220B and storing the data in the page buffer 15 according to the read command 4̂ in a tR period. Next, to copy data stored in the page buffer 15 to the RAM 207 of the memory controller 210A' 240A', 210B' or 240B', a direct memory accessing operation is performed in the tDMA period.

After the read operation according to the read command 4̂ is completed in the tR period and it is confirmed that no additional read command is received in a read anticipation time tRA period T3, the storage device 200, 200-1A, or 200-1B performs the postponed program command 2̂.

In other words, the storage device 200, 200-1A, or 200-1B performs a direct memory accessing operation for copying data stored in the write cache buffer 207-1 of the RAM 207 of the memory controller 210A' 240A', 210B' or 240B' to the page buffer 15 of the memory device 220A or 220B according to the program command 2̂ in the tDMA period. Next, an operation for programming data stored in the page buffer 15 to the memory cell array 11 of the memory device 220A or 220B is performed in a period tProg.

Therefore, the storage device 200, 200-1A, or 200-1B performs commands in the order of a read command $\hat{1}\rightarrow$a read command $\hat{3}\rightarrow$a read command $\hat{4}\rightarrow$a program command $\hat{2}$.

Next, a method of processing I/Os in a storage device, according to the embodiments shown in FIGS. 1 through 4, in various types of computing systems will be described below with reference to the flowcharts shown in FIGS. 22 through 24.

Figure 22:
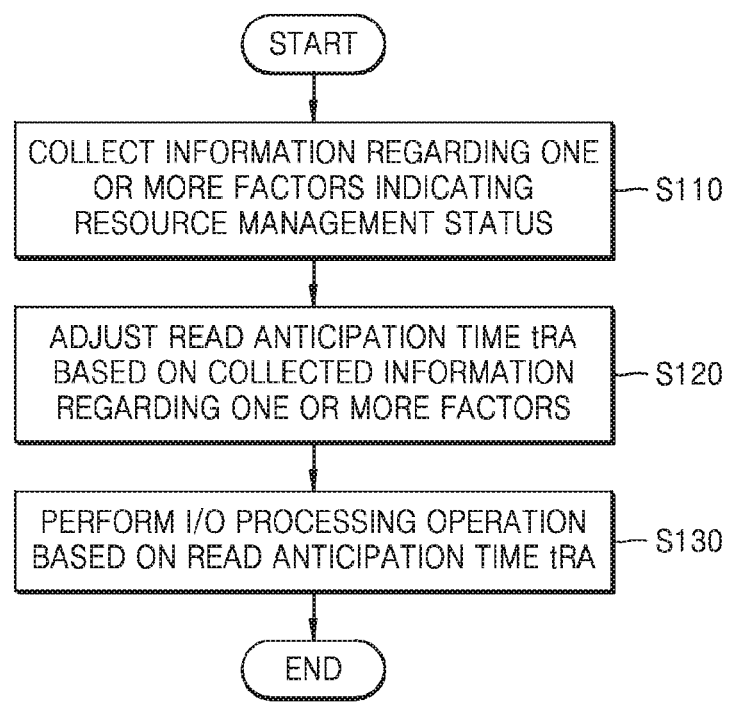
FIG. 22 is a flowchart showing a method of processing I/Os in a storage device, according to an embodiment.

FIG. 22 is a flowchart showing a method of processing I/Os in a storage device, according to an embodiment.

First, a computing system collects information regarding one or more factors indicating a resource management status related to operations of the storage device (operation S110). For example, a memory controller of a storage device may collect information regarding one or more factors indicating a resource management status from a host to a memory device.

For example, the memory controller may set windows to an initially set unit time and collect information regarding one or more factors indicating a resource management status from a host to a non-volatile memory device in each of the windows.

For example, the information regarding one or more factors indicating a resource management status may include information regarding one or more factors related to host resources or host workloads. In another example, the information regarding factors related to the host resources may include queue depth information. Here, the information regarding factors related to the host workloads may include at least one of information regarding an I/O count, information regarding a queue depth, and information regarding an I/O rate. In another example, the information regarding one or more factors indicating a resource management status may include information regarding one or more factors indicating a management status regarding I/O resources in the storage device or an IPC resource management status. In another example, the information regarding one or more factors indicating a resource management status may include information regarding one or more factors indicating a resource management status related to a non-volatile memory device constituting the storage device. Here, the information regarding one or more factors indicating a resource management status related to the non-volatile memory device may include at least one of read command issue count information, write command issue count information, or idle time ratio information regarding the non-volatile memory device.

Next, the computing system adjusts a read anticipation time tRA based on collected information regarding the one or more factors (operation S120). For example, if the collected information regarding the one or more factors indicates that the size of data stored in a write cache buffer of the storage device is increased, the memory controller of the computing system may reduce the read anticipation time, and, if the collected information regarding one or more factors indicates that the size of data stored in a write cache buffer of the storage device is reduced, the memory controller of the computing system may increase the read anticipation time.

In another example, if the collected information regarding the one or more factors indicates that a number of issuances of write commands received by the storage device per unit time increases, the memory controller of the storage device may reduce the read anticipation time, and, if the collected information regarding one or more factors indicates that a number of issuances of write commands received by the storage device per unit time decreases, the memory controller may increase the read anticipation time. In another example, if the collected information regarding the one or more factors indicates that a number of issuances of read commands received by the storage device per unit time increases, the memory controller of the storage device may reduce the read anticipation time, and, if the collected information regarding one or more factors indicates that a number of issuances of read commands received by the storage device per unit time decreases, the memory controller may increase the read anticipation time.

The read anticipation time tRA is adjusted in the operations S110 and S120 based on a change of a resource management status related to operations of the storage device.

Next, the computing system performs an I/O processing operation at the storage device based on the read anticipation time tRA adjusted as described above (operation S130).

For example, the computing system may perform an I/O processing operation to postpone issuance of a program command to a non-volatile memory device in a period from completion of a read operation at a software module of the storage device to a read anticipation time tRA and to issue the postponed program command at a time point at which the read anticipation time tRA has elapsed.

In another example, the computing system may perform an I/O processing operation to block issuance of a program command and allow issuance of a read command to the non-volatile memory device in a period from completion of a read operation at a hardware module of the storage device to the read anticipation time tRA and to issue a program command or a read command to the non-volatile memory device in an order in which commands are received from a host in a period from the time point at which the read anticipation time tRA is elapsed.

In another example, the computing system may receive information regarding a read anticipation time tRA from the non-volatile memory of the storage device and may perform an I/O processing operation to postpone issuance of a program command in a period from completion of a read operation at the internal circuit of the non-volatile memory device to the read anticipation time tRA and to issue the postponed program command at a time point at which the read anticipation time tRA has elapsed.

Figure 23:
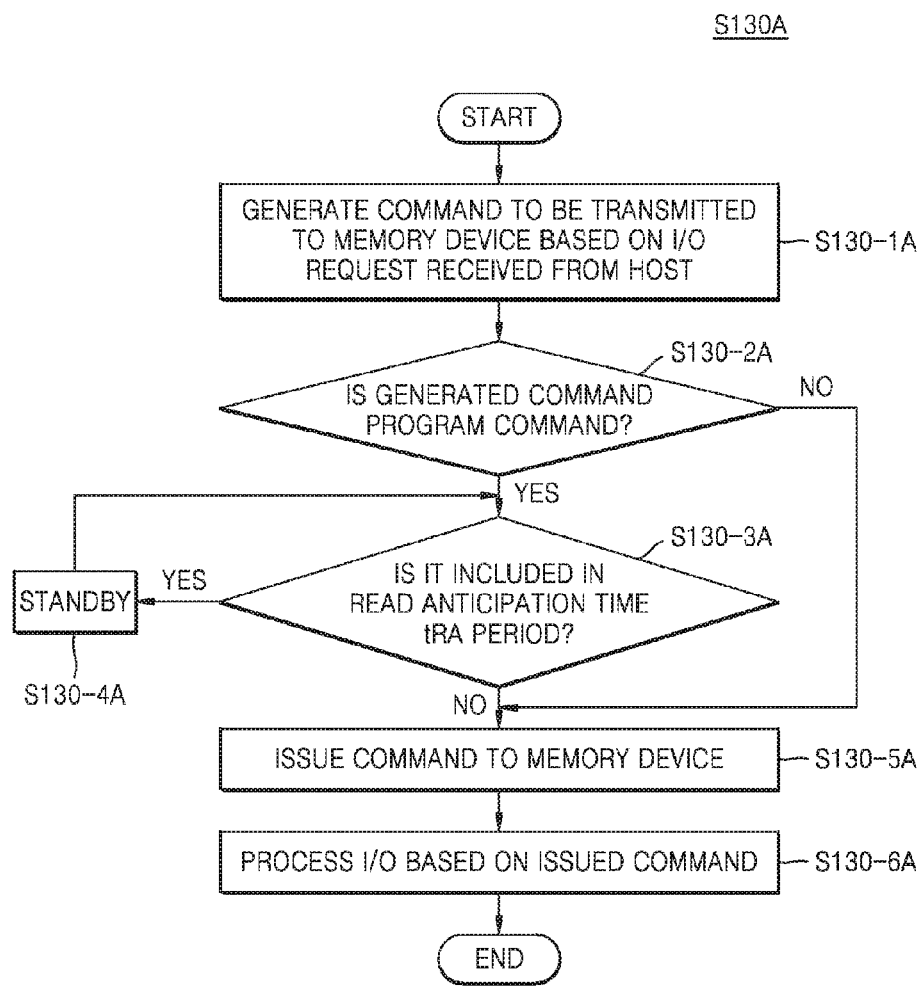
FIG. 23 shows an example of detailed sub-operations of an I/O processing control operation of FIG. 22.

FIG. 23 shows an example S130A of detailed sub-operations of the I/O processing control operation S130 of FIG. 22. FIG. 23 shows an example that the I/O processing control operation S130 is performed at a memory controller of a storage device.

The storage device generates a command to be transmitted to a memory device based on a command received from a host (operation S130-1A). The storage device generates a command that may be processed by the memory device based on an I/O request received from the host. Here, an operation for transforming a logical address included in the I/O request into a physical address of the memory device is also performed. For example, the storage device generates a command for performing a read operation or a write operation with respect to a flash memory device constituting the memory device page-by-page based on an I/O request received from the host.

The storage device determines whether a generated command is a program command (operation S130-2A).

If it is determined in the operation S130-2A that the generated command is a program command, the storage device determines whether a current time is included in a read anticipation time tRA period (operation S130-3A). Here, the read anticipation time tRA period refers to a period from completion of a read operation to the read anticipation time.

If it is determined in the operation S130-3A that the current time is included in the read anticipation time tRA, the storage device enters into standby status (operation S130-4A). Therefore, the storage device postpones issuance of a program command to the memory device in the read anticipation time tRA period.

If it is determined in the operation S130-2A that the generated command is a read command instead of a program command or it is determined in the operation S130-3A that the current time is not included in the read anticipation time tRA, the storage device issues the command generated in the operation S130-1A to the memory device (operation S130-5A). Therefore, a read command is issued to the memory device at high priority regardless of the read anticipation time tRA period, whereas issuance of a program command to the memory device is postponed in the read anticipation time tRA period. Furthermore, in periods other than the read anticipation time tRA, a read command or a write command is issued to the memory device based on an order that I/O requests are received from the host.

The storage device performs an I/O processing operation based on a command issued to the memory device (operation S130-6A). In other words, the storage device transmits an issued command to the memory device and performs a data input operation or a data output operation for performing the issued command at the memory device.

Figure 24:
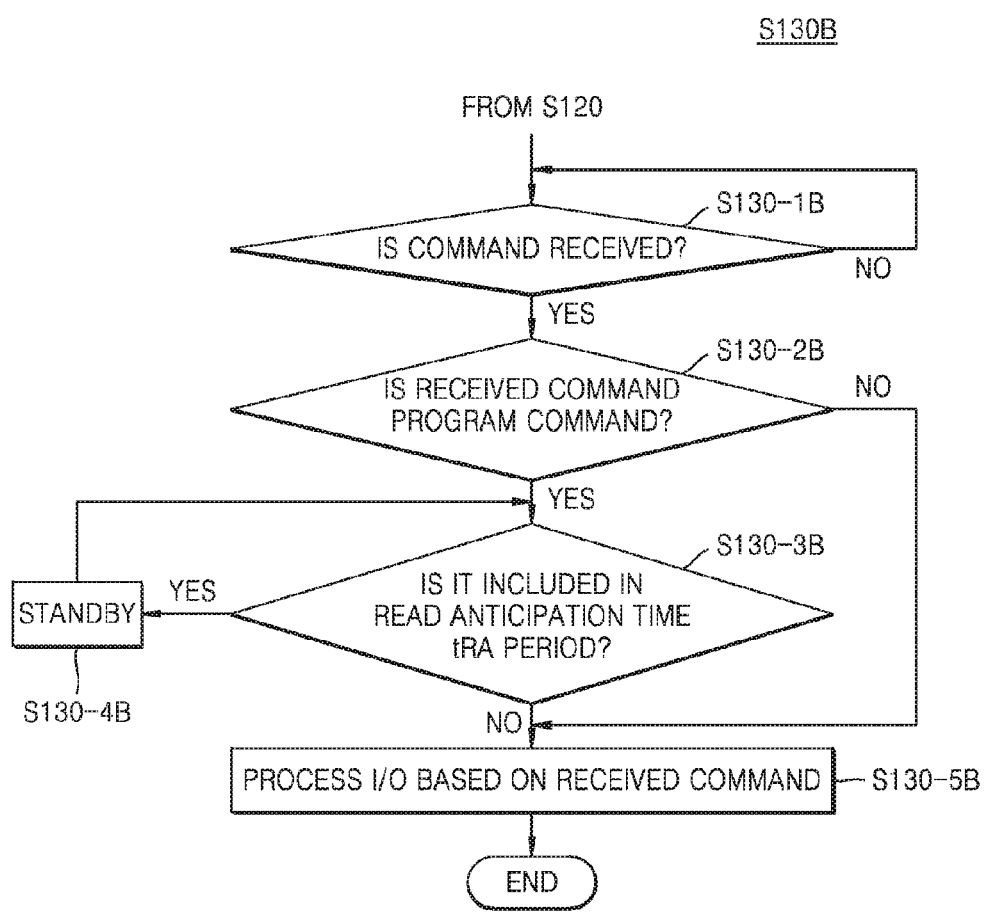
FIG. 24 shows another example of detailed sub-operations of the I/O processing control operation of FIG. 22.

FIG. 24 shows another example S130B of detailed sub-operations of the I/O processing control operation S130 of FIG. 22. FIG. 24 shows an example that the I/O processing control operation S130 is performed at a control logic of a memory device of a storage device.

First, the memory device determines whether a command is received from the storage device (operation S130-1B). For example, the memory device determines whether a program command or a read command is received from the storage device.

If it is determined in the operation S130-1B that a command is received, the memory device determine whether the received command is a program command (operation S130-2B).

If it is determined in the operation S130-2B that the command received by the memory device is a program command, the memory device determines whether a current time is included in a read anticipation time tRA period (operation S130-3B). Here, the read anticipation time tRA period refers to a period from completion of a read operation to the read anticipation time.

If it is determined in the operation S130-3B that the current time is included in the read anticipation time tRA, the storage device enters into standby status (operation S130-4B). Therefore, the storage device postpones issuance of a program command to the memory device in the read anticipation time tRA period.

If it is determined in the operation S130-2B that the generated command is a read command instead of a program command or it is determined in the operation S130-3B that the current time is not included in the read anticipation time tRA, the storage device issues the command generated in the operation S130-1B to the memory device (operation S130-5B). In other words, the storage device performs a data input operation or a data output operation for performing a received command at the memory device.

Meanwhile, a storage device according to the embodiments as described above may be mounted by using various types of packages. For example, a storage device according to an embodiment may be mounted by using one of packages including package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metricquad flat pack (MQFP), thin quad flatpack (TQFP), small outline (SOIC), shrink small outline package (SSOP), thin small outline (TSOP), thin quad flatpack (TQFP), system in package (SIP), multi chip package (MCP), wafer-level fabricated package (WFP), wafer-level processed stack package (WSP), etc.

While the disclosure has been particularly shown and described with reference to exemplary embodiments thereof, it will be understood that various changes in form and details may be made therein without departing from the spirit and scope of the following claims.

What is claimed is:

1. A method of processing input/output (I/O) in a storage device, the method comprising:
    adjusting a read anticipation time based on a change of a resource management status related to operations of the storage device; and
    performing an I/O processing operation at the storage device based on the adjusted read anticipation time, wherein
    the I/O processing operation is performed to postpone an operation regarding a program command and to execute a read command at higher priority than a write command at the storage device only in a period from completion of a read operation at the storage device until the read anticipation time has elapsed from the completion of the read operation.

2. The method of claim 1, wherein the storage device sets windows to an initially set unit time and detects the change of the resource management status based on a result of collecting information regarding one or more factors indicating the resource management status in each of the windows.

3. The method of claim 1, wherein the storage device detects the change of the resource management status based on information regarding one or more factors related to host resources or host workloads.

4. The method of claim 3, wherein the information regarding one or more factors related to the host resources comprises queue depth information.

5. The method of claim 3, wherein the information regarding one or more factors related to the host workloads comprises at least one of information regarding an I/O count, information regarding a queue depth, and information regarding an I/O rate.

6. The method of claim 1, wherein the storage device detects the change of the resource management status based on information regarding one or more factors indicating a management status regarding I/O resources in the storage device or an inter process communication (IPC) resource management status.

7. The method of claim 1, wherein the storage device detects the change of the resource management status based on information regarding one or more factors indicating the resource management status related to a non-volatile memory device constituting the storage device.

8. The method of claim 7, wherein the storage device detects the change of the resource management status based on at least one of read command issue count information, write command issue count information, and idle time ratio information regarding the non-volatile memory device.

9. The method of claim 1, wherein, in the adjusting of the read anticipation time, if collected information regarding one or more factors indicates that a size of data stored in a write cache buffer of the storage device is increased, the read anticipation time is reduced, and,
if the collected information regarding one or more factors indicates that a size of data stored in the write cache buffer of the storage device is reduced, read anticipation time is increased.

10. The method of claim 1, wherein:
in the adjusting of the read anticipation time, if collected information regarding one or more factors indicates that write command issue count information received by the storage device increases, the read anticipation time is reduced, and
if the collected information regarding one or more factors indicates that the write command issue count information received by the storage device decreases, the read anticipation time is increased.

11. The method of claim 1, wherein:
in the adjusting of the read anticipation time, if collected information regarding one or more factors indicates that read command issue count information received by the storage device increases, the read anticipation time is increased, and
if the collected information regarding one or more factors indicates that the read command issue count information received by the storage device decreases, the read anticipation time is reduced.

12. The method of claim 1, wherein in the performing of the I/O processing operation, issuance of the program command to a non-volatile memory device is postponed in a period from completion of another I/O processing operation at a software module of the storage device to the read anticipation time and the postponed program command is issued at a time point at which the read anticipation time has elapsed.

13. The method of claim 1, wherein in the performing of the I/O processing operation:
issuance of the program command to a non-volatile memory device is blocked in a period from completion of another I/O processing operation at a hardware module of the storage device to the read anticipation time, and
the program command and another read command are issued to the storage device, in a period from a time point at which the read anticipation time has elapsed, according to an order in which the program command and the other read command are received from a host.

14. The method of claim 1, wherein in the performing of the I/O processing operation:
information regarding the read anticipation time is received from a non-volatile memory device included in the storage device,
issuance of the program command to the non-volatile memory device is postponed in a period from completion of the read operation in an internal circuit of the non-volatile memory device to the read anticipation time, and
the postponed program command is issued at a time point at which the read anticipation time has elapsed.

15. A storage device comprising:
a non-volatile memory device; and
a memory controller, which:
adjusts a read anticipation time based on a change of a resource management status related to operations of the storage device, and
performs an I/O processing operation to block an operation regarding a program command at the non-volatile memory device, regardless of an order in which commands are requested, and execute a read command at higher priority than a write command, only in a period from completion of a read operation at the storage device until the read anticipation time has elapsed from the completion of the read operation.

16. The storage device of claim 15, wherein in the period from completion of the read operation at the non-volatile memory device until the read anticipation time has elapsed, the memory controller postpones issuance of the program command and allows issuance of the read command.

17. The storage device of claim 16, wherein after the read anticipation time has elapsed after a time point at which the read operation is completed, the memory controller issues the program command or another read command to the non-volatile memory device in accordance with an order in which the program command and the other read command are received from a host.

18. The storage device of claim 15, wherein the non-volatile memory device comprises a flash memory device.

19. The storage device of claim 15, wherein the memory controller sets windows to an initially set unit time and detects the change of the resource management status based on a result of collecting information regarding one or more factors indicating the resource management status in each of the windows.

20. The storage device of claim 19, wherein the memory controller adjusts the read anticipation time based on a moving average of the one or more factors with a plurality of windows as a unit.

* * * * *